United States Patent
Park et al.

(10) Patent No.: US 10,719,165 B2
(45) Date of Patent: Jul. 21, 2020

(54) TOUCH SENSING APPARATUS BASED ON ULTRASONIC WAVES, COOKING APPARATUS AND HOME APPLIANCE INCLUDING THE SAME

(71) Applicant: LG ELECTRONICS INC., Seoul (KR)

(72) Inventors: Yunsik Park, Seoul (KR); Jihyun Song, Seoul (KR); Lagyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 199 days.

(21) Appl. No.: 15/479,693

(22) Filed: Apr. 5, 2017

(65) Prior Publication Data

US 2017/0285792 A1  Oct. 5, 2017

(30) Foreign Application Priority Data

Apr. 5, 2016 (KR) .................. 10-2016-0041761

(51) Int. Cl.
   *G06F 3/041* (2006.01)
   *F24C 7/08* (2006.01)
   *G06F 3/043* (2006.01)

(52) U.S. Cl.
   CPC ............ *G06F 3/0416* (2013.01); *F24C 7/082* (2013.01); *G06F 3/0436* (2013.01); *G06F 2203/04105* (2013.01)

(58) Field of Classification Search
   CPC ...... G06F 3/043; G06F 3/0414; G06F 3/0436; F24C 7/082

(Continued)

(56) References Cited

U.S. PATENT DOCUMENTS 6,922,642 B2 * 7/2005 Sullivan .................. G06F 3/043
                                                      702/150
7,088,347 B2 * 8/2006 Iisaka ..................... G06F 1/1626
                                                      178/18.01

(Continued)

FOREIGN PATENT DOCUMENTS

CN   102043529   5/2011
CN   102151069   8/2011

(Continued)

OTHER PUBLICATIONS

Extended European Search Report in European Application No. 17164929.6, dated Oct. 4, 2017, 9 pages (with English translation).

(Continued)

*Primary Examiner* — Jason M Mandeville
(74) *Attorney, Agent, or Firm* — Fish & Richardson P.C.

(57) ABSTRACT

A touch sensing apparatus includes a first plate configured to receive a touch input, a second plate spaced apart from the first plate, a piezoelectric element disposed between the first and second plates, the piezoelectric element being configured to generate electrical signals corresponding to the touch input received on the first plate, an ultrasonic output unit configured to output ultrasonic signals based on the electrical signals generated from the piezoelectric element, a plurality of microphones configured to receive the ultrasonic signals, and a processor configured to determine a position of the touch input on the first plate based on the ultrasonic signals received by the plurality of microphones.

16 Claims, 23 Drawing Sheets

(58) Field of Classification Search
USPC .......................................................... 345/177
See application file for complete search history.

(56) References Cited

U.S. PATENT DOCUMENTS

| | | | | |
|---|---|---|---|---|
| 8,488,413 | B2* | 7/2013 | Nishino | G06F 3/0433 |
| | | | | 367/127 |
| 9,652,068 | B2* | 5/2017 | Li | G06F 3/0414 |
| 9,772,721 | B2* | 9/2017 | Huppi | G06F 3/0414 |
| 2005/0212775 | A1* | 9/2005 | Lee | G06F 3/0436 |
| | | | | 345/173 |
| 2009/0273583 | A1* | 11/2009 | Norhammar | G06F 3/0436 |
| | | | | 345/177 |
| 2010/0141410 | A1* | 6/2010 | Aono | G06F 3/0414 |
| | | | | 340/407.2 |
| 2010/0283745 | A1* | 11/2010 | Nikolovski | G06F 3/0436 |
| | | | | 345/173 |
| 2011/0254762 | A1 | 10/2011 | Dahl et al. | |
| 2012/0111119 | A1 | 5/2012 | Small et al. | |
| 2013/0201134 | A1 | 8/2013 | Schneider et al. | |
| 2015/0123931 | A1 | 5/2015 | Kitchens et al. | |
| 2015/0277645 | A1* | 10/2015 | Li | G06F 3/0414 |
| | | | | 345/173 |
| 2016/0054826 | A1* | 2/2016 | Huppi | G06F 3/0436 |
| | | | | 345/177 |
| 2016/0259441 | A1* | 9/2016 | Sha | G06F 1/3262 |
| 2017/0255338 | A1* | 9/2017 | Medina | G06F 3/0414 |

FOREIGN PATENT DOCUMENTS

| | | |
|---|---|---|
| CN | 102461330 | 5/2012 |
| CN | 202216299 | 5/2012 |
| CN | 202253808 | 5/2012 |
| CN | 102644943 | 8/2012 |
| CN | 202432566 | 9/2012 |
| CN | 102783247 | 11/2012 |
| CN | 102961026 | 3/2013 |
| CN | 203131894 | 8/2013 |
| DE | 10342006 | 3/2005 |
| JP | 2006099608 | 4/2006 |
| KR | 10-2006-0034971 | 4/2006 |
| KR | 10-2008-0050169 | 6/2008 |
| KR | 10-2010-0065816 | 6/2010 |
| KR | 10-2011-0042007 | 4/2011 |
| WO | 200065530 | 11/2000 |

OTHER PUBLICATIONS

Chinese Office Action in Chinese Appln. No. 201710218220.5, dated Jan. 31, 2019, 19 pages (with English translation).

* cited by examiner (a)

(b)

TOUCH SENSING APPARATUS BASED ON ULTRASONIC WAVES, COOKING APPARATUS AND HOME APPLIANCE INCLUDING THE SAME

CROSS-REFERENCE TO RELATED APPLICATION

This application claims the priority benefit of Korean Patent Application No. 10-2016-0041761, filed on Apr. 5, 2016 in the Korean Intellectual Property Office, the disclosure of which is incorporated herein by reference.

FIELD

The present disclosure relates to a touch sensing apparatus based on ultrasonic waves, and a cooking apparatus and home appliance including the touch sensing apparatus.

BACKGROUND

Various products such as a microwave oven using microwaves, an oven using a heater, and a cooktop are widely used as cooking apparatuses.

The microwave oven radiates microwaves generated by a magnetron in an enclosed cooking chamber and vibrates water molecules of food put into the cooking chamber to heat food, and the oven heats an enclosed cooking chamber using the heater to heat food put into the cooking chamber.

The cooktop heats a vessel laid thereon to heat food contained in the vessel and a representative example thereof includes a gas cooktop using gas as a heating source. Recently, a cooktop using electricity is attracting attention.

SUMMARY

According to one aspect of the subject matter described in this application, a touch sensing apparatus includes a first plate configured to receive a touch input, a second plate spaced apart from the first plate, a piezoelectric element disposed between the first and second plates, the piezoelectric element being configured to generate electrical signals corresponding to the touch input received on the first plate, an ultrasonic output unit configured to output ultrasonic signals based on the electrical signals generated from the piezoelectric element, a plurality of microphones configured to receive the ultrasonic signals, and a processor configured to determine a position of the touch input on the first plate based on the ultrasonic signals received by the plurality of microphones.

Implementations according to this aspect may include one or more of the following features. For example, the processor may be configured to determine the position of the touch input based on a difference between phases of the ultrasonic signals received by the plurality of microphones. The processor may be configured determine the position of the touch input on the first plate based on both a difference between levels and a difference between phases of the ultrasonic signals received by the plurality of microphones. The processor may include a preprocessor configured to perform a noise reduction signal processing of the ultrasonic signals received by the plurality of microphones, and an acoustic sound localization unit configured to determine an acoustic source location based on the processed signals from the preprocessor. The touch sensing apparatus may further include a calibration unit configured to calibrate the acoustic source location, and an optimizer configured to optimize the calibrated acoustic source location.

In some implementations, the touch sensing apparatus may further include a display. The processor may be configured to control a portion of the display corresponding to the determined position of the touch input to display a visual indicator. The touch sensing apparatus may further include a communication unit, and the processor may be configured to control the communication unit to transmit information corresponding to the determined position of the touch input to an external device.

According to another aspect of the subject matter described in this application, a touch sensing apparatus may include a first plate configured to receive a touch input, a second plate spaced apart from the first plate, a piezoelectric element disposed between the first and second plates and configured to generate electrical signals corresponding to the touch input on the first plate, an ultrasonic output unit configured to output ultrasonic signals, a plurality of microphones configured to receive the ultrasonic signals, and a processor configured to determine a position of the touch input on the first plate based on a change in the ultrasonic signals received by the plurality of microphones.

Implementations according this aspect may include one or more of the following features. For example, the ultrasonic output unit may be configured to output a plurality of ultrasonic signals having different frequencies from each other, and the processor may be configured to determine the position of the touch input on the first plate based on respective changes in the plurality of ultrasonic signals. The processor may be configured to determine the position of the touch input on the first plate based on a difference between phases of the ultrasonic signals received by the plurality of microphones.

In some implementations, the processor may include a preprocessor configured to perform a noise reduction signal processing of the ultrasonic signals received by the plurality of microphones, and an acoustic sound localization unit configured to determine an acoustic source location based on the processed signals from the preprocessor. The touch sensing apparatus may further include a calibration unit configured to calibrate the determined acoustic source location, and an optimizer to optimize the calibrated acoustic source location.

According to another aspect of the subject matter described in this application, a cooking apparatus includes a first plate configured to receive a pressure input, a second plate spaced apart from the first plate, a piezoelectric element disposed between the first and second plates and configured to generate electrical signals corresponding to the pressure input on the first plate, a plurality of coils disposed under the second plate, an ultrasonic output unit configured to output ultrasonic signals based on the electrical signals generated from the piezoelectric element, a plurality of microphones configured to receive the ultrasonic signals, and a controller configured to determine a position of the pressure input on the first plate based on the ultrasonic signals received by the plurality of microphones. The controller is configured, based on the determined position of the pressure input corresponding to one of the plurality of coils, to activate the corresponding one of the plurality of coils.

Implementations according this aspect may include one or more of the following features. For example, the cooking apparatus may further include a plurality of displays each of which corresponds to the plurality of coils, and the controller may be configured to turn on one of the plurality of displays corresponding to the activated one of the plurality of coils. The controller may be configured to control an intensity of a current to the activated coil based on a change of the pressure input or an additional pressure input applied at a position corresponding to the activated coil. For example, the controller may be configured, based on determining that an overflowing food item has applied the additional pressure input at the position corresponding to the activated coil, to decrease the intensity of the current to the activated coil. The controller may be configured, based on a touch input being received on the first plate, to set a period for applying a current or an intensity of the current.

According to another aspect of the subject matter described in this application, a home appliance includes a touch sensing apparatus configured to receive a touch input and determine a position of the touch input, and a controller configured to perform an operation corresponding to the touch input. The touch sensing apparatus includes a first plate configured to receive the touch input, a second plate spaced apart from the first plate, a piezoelectric element disposed between the first and second plates and configured to generate electrical signal corresponding to the touch input on the first plate, an ultrasonic output unit configured to output ultrasonic signals based on the electrical signal from the piezoelectric element, a plurality of microphones configured to receive the ultrasonic signals, and a processor configured to determine the position of the touch input on the first plate based on the ultrasonic signals received by the plurality of microphones.

DETAILED DESCRIPTION

Figure 1:
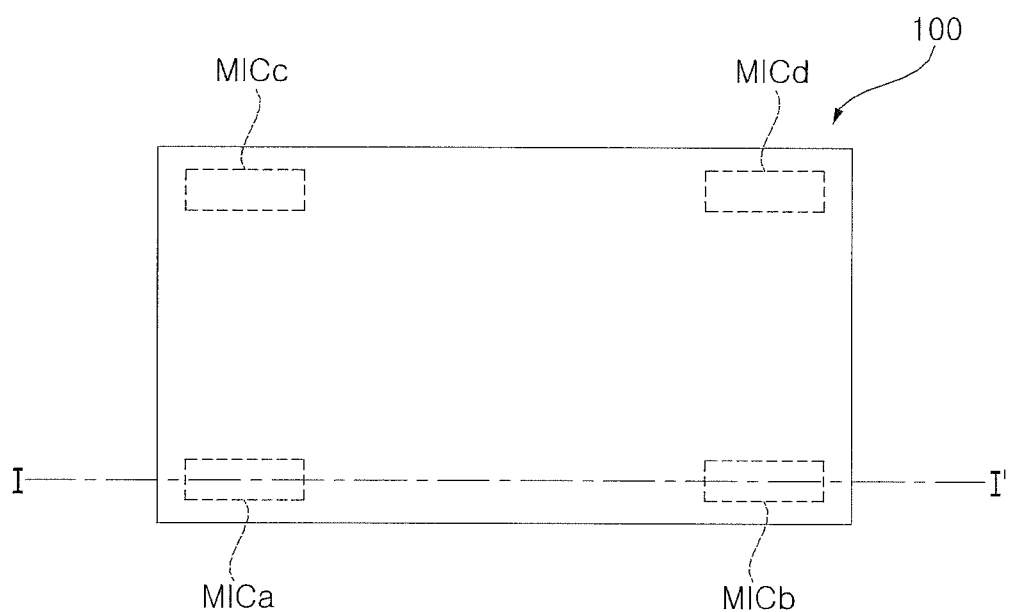
FIG. 1 is a diagram showing an example touch sensing apparatus based on ultrasonic waves.
Figure 2:
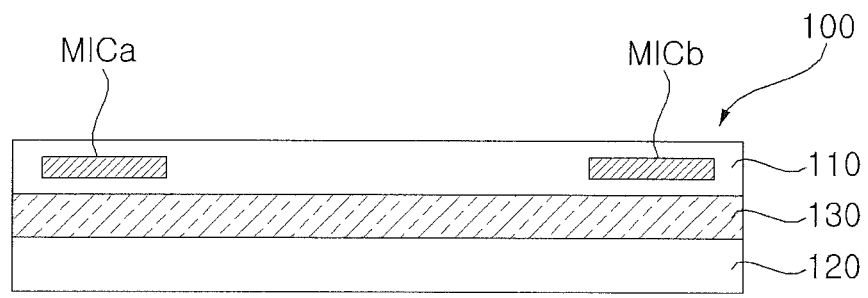
FIG. 2 is a side view showing the example touch sensing apparatus of FIG. 1.

FIG. 1 is a diagram showing an example touch sensing apparatus based on ultrasonic waves, and FIG. 2 is a side view showing the touch sensing apparatus based on ultrasonic waves of FIG. 1.

The example touch sensing apparatus based on ultrasonic waves of FIGS. 1 and 2 may include a first plate 110, a second plate 120 spaced apart from the first plate 110, a piezoelectric element 130 disposed between the first and second plates 120 to output an electrical signal in correspondence with touch input on the first plate 110, an ultrasonic output unit USO for outputting ultrasonic waves based on the electrical signal from the piezoelectric element 130, a plurality of microphones MICa to MICd for receiving ultrasonic waves, and a processor to calculate the position of the touch input on the first plate 110 based on the sound signals collected by the plurality of microphones MICa to MICd.

Referring to FIG. 1, the plurality of microphones MICa to MICd in the touch sensing apparatus 100 based on ultrasonic waves may be spaced apart from each other.

For example, as shown in the figure, four microphones MICa to MICd are provided near corners of the touch sensing apparatus to be spaced apart from each other.

FIG. 2 is a side view showing the touch sensing apparatus 100 based on ultrasonic waves taken along line I-I' of FIG. 1. Referring to FIG. 2, the plurality of microphones MICa to MICd is located in the first plate 110.

The first plate 110 may be a case of the touch sensing apparatus 100 based on ultrasonic waves and may be made of various materials such as ceramic, tempered glass, etc.

The second plate 120 may be spaced apart from the first plate 110 and may be made of various materials such as ceramic, tempered glass, etc.

The piezoelectric element 130 may be disposed between the first and second plates 110 and 120 and output an electrical signal corresponding to pressure using piezoelectric effects.

The piezoelectric element 130 may generate a voltage by applied force. The level of the voltage may be changed according to the intensity of applied force.

For example, the piezoelectric element 130 may include a ferroelectric material such as lead zirconate titanate [Pb(Ti, Zr)O3] (PZT), barium titanate (BaTiO3), etc.

The ultrasonic output unit USO may be attachable to the piezoelectric element 130 and output ultrasonic waves based on the electrical signal from the piezoelectric element 130.

For example, the ultrasonic output unit USO may output ultrasonic waves with a frequency from several tens of kHz to several MHz higher than an audible frequency that is from 20 to 20,000 Hz.

The ultrasonic output unit USO may output ultrasonic waves with an increased sound level, sound intensity or frequency in proportion to the level of the electrical signal generated by the piezoelectric element 130, for example, the level of the voltage.

In the present disclosure, as the intensity of touch input on the first plate 110 increases, the level of the electrical signal output from the piezoelectric element 130, e.g., the level of the voltage, may increase and the ultrasonic output unit USO may output ultrasonic waves with an increased sound level, sound intensity, or frequency.

The processor 170 may calculate the position of touch input on the first plate 110 based on the sound signals collected by the plurality of microphones MICa to MICd.

For example, the processor 170 may calculate the position of touch input on the first plate 110 based on a difference in phase between the sound signals collected by the plurality of microphones MICa to MICd.

In some implementations, the processor 170 may calculate the position of touch input on the first plate 110 based on a difference in level and phase between the sound signals collected by the plurality of microphones MICa to MICd.

It may be possible to conveniently sense touch input through the touch sensing apparatus 100 based on ultrasonic waves.

For example, unlike a capacitive touch sensing method, it may be possible to conveniently and accurately sense touch input by a wet hand using ultrasonic waves. That may increase user convenience.

The touch sensing apparatus 100 based on ultrasonic waves may sense pressure generated when a specific object is laid thereon, and a pressure generation position, in addition to touch input by a finger.

For example, if the touch sensing apparatus 100 based on ultrasonic waves is used for a cooking apparatus, it may be possible to sense a pressure generated by a cooking vessel and a pressure generation position to sense the position of the cooking vessel.

The processor 170 may perform control to display a portion of a display at a position corresponding to the calculated position of the touch input. Therefore, a user may intuitively recognize touch input.

The processor 170 may also perform control to transmit the calculated position information of the touch input to an external device through a communication unit 135. For example, by transmitting the position information of the sensed touch input or the pattern information of the touch input to an external device through wireless communication, it may be possible to remotely control the external device. Accordingly, user convenience may be increased.

FIGS. 3a to 3d describes example operations of the touch sensing apparatus based on ultrasonic waves of FIG. 1.

Figure 3A:
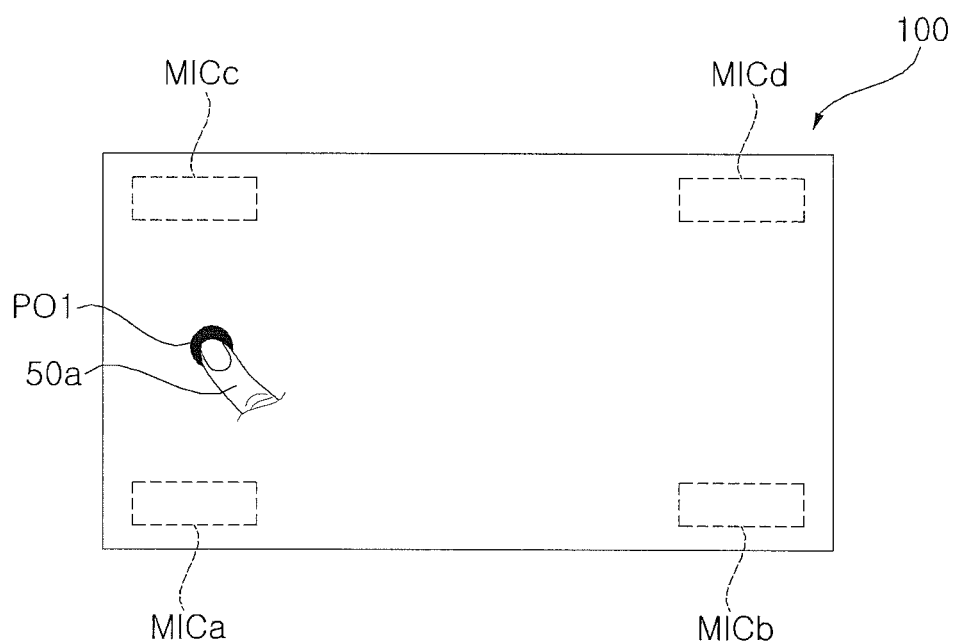
FIGS. 3a to 3d are views showing example operations of the touch sensing apparatus of FIG. 1.

First, FIG. 3a shows an example touch input by a user finger 50a located at a first position PO1 on the first plate 110 of the touch sensing apparatus 100 based on ultrasonic waves.

As described above, the piezoelectric element 130 may output an electrical signal at a position corresponding to the first position PO1 on the first plate 110.

The ultrasonic output unit USO outputs ultrasonic waves based on the electrical signal from the piezoelectric element 130 at the position corresponding to the first position PO1.

Figure 3B:
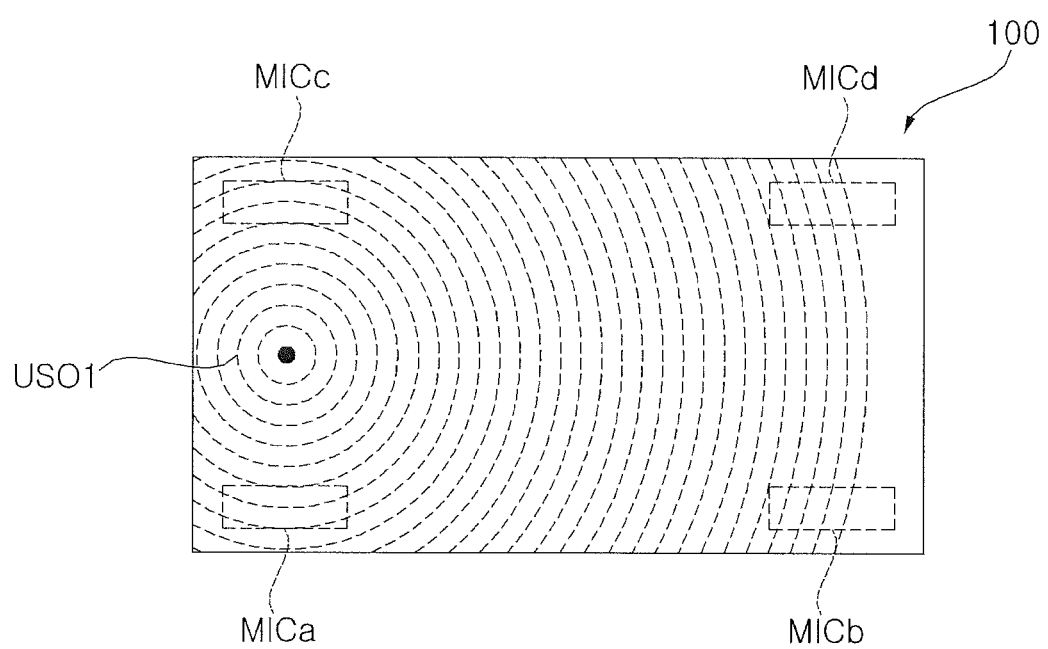

FIG. 3b shows an example ultrasonic wave USO1 output at the first position PO1 as a source on the touch sensing apparatus 100 based on ultrasonic waves, more particularly, on the first plate 110.

The plurality of microphones MICa to MICd may collect such an ultrasonic wave.

The processor 170 may calculate the position of the touch input on the first plate 110 based on a difference in phase between the sound signals (e.g., ultrasonic signals) collected by the plurality of microphones MICa to MICd.

For example, as shown in the figure, when touch input is generated at the first position PO1 which is a middle point between the first microphone MICa and the third microphone MICb, the phases of the sound signals collected by the first microphone MICa and the third microphone MICb may be identical, and the phases of the sound signals collected by the second microphone MICb and the fourth microphone MICd may be identical and may be delayed from the phases of the sound signals collected by the first microphone MICa and the third microphone MICb.

The processor 170 may calculate the position of the touch input in consideration of such a phase difference.

Since the position of the touch input is calculated based on ultrasonic waveform, it may be possible to accurately and conveniently calculate touch input even when a finger is wet or a water drop falls. Accordingly, user convenience may be increased.

Figure 3C:
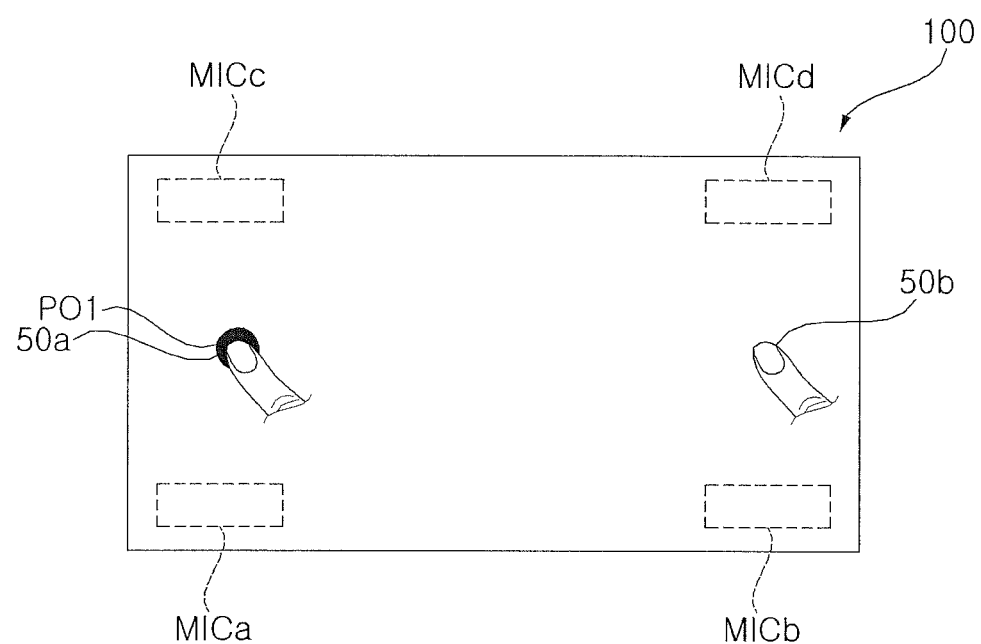

Next, FIG. 3c shows touch input by the user finger 50a at a first position PO1 and a second position PO2 on the touch sensing apparatus 100 based on ultrasonic waves.

As described above, the piezoelectric element 130 may output electrical signals at positions corresponding to the first position PO1 and the second position PO2 on the first plate 110.

The ultrasonic output unit USO may output ultrasonic waves based on the electrical signals from the piezoelectric element 130 at the positions corresponding to the first position PO1 and the second position PO2.

Figure 3D:
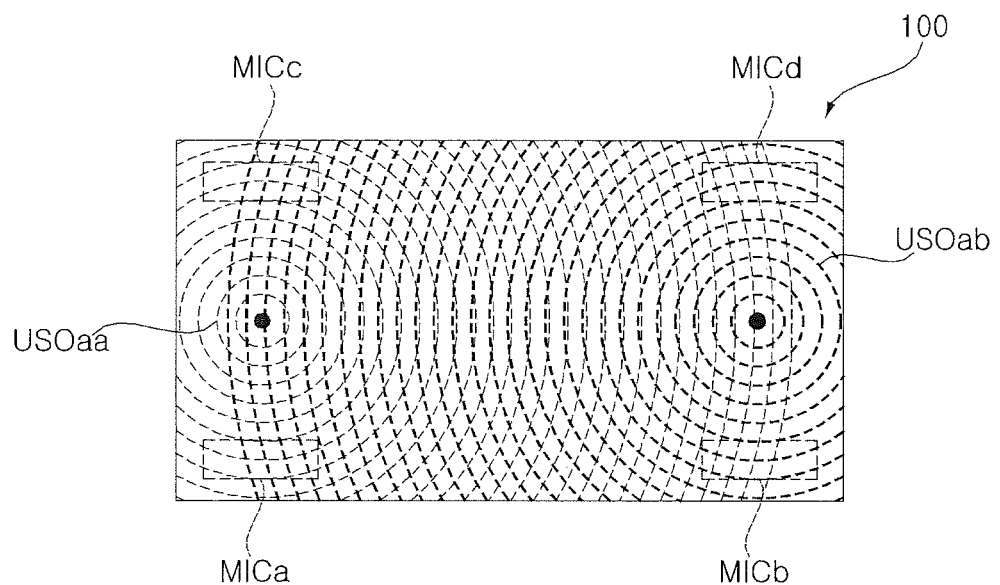

FIG. 3d shows an example ultrasonic wave USOaa output at the position PO1 as a source and another example ultrasonic wave USOab output at the second position PO2 as a source in the touch sensing apparatus 100 based on ultrasonic waves, more particularly, on the first plate 110.

The plurality of microphones MICa to MICd may collect such ultrasonic waves USOaa and USOab.

The processor 170 may calculate the position of the touch input on the first plate 110 based on the difference in phase between the sound signals (e.g., ultrasonic signals) collected by the plurality of microphones MICa to MICd.

For example, as shown in the figure, if touch input is generated at the first position PO1 which is a middle point between the first microphone MICa and the third microphone MICb, the phases of the sound signals collected by the first microphone MICa and the third microphone MICb may be identical, and the phases of the sound signals collected by the second microphone MICb and the fourth microphone MICd may be identical and may be delayed from the phases of the sound signals collected by the first microphone MICa and the third microphone MICb.

For example, as shown in the figure, if touch input is generated at the second position PO2 which is a middle point between the second microphone MICb and the fourth microphone MICd, the phases of the sound signals collected by the second microphone MICb and the fourth microphone MICd may be identical, and the phases of the sound signals collected by the first microphone MICa and the third microphone MICb may be identical and may be delayed from the phases of the sound signals collected by the second microphone MICb and the fourth microphone MICd.

The processor 170 may calculate the position of the touch input in consideration of such a phase difference.

Referring to FIGS. 3c and 3d, the processor 170 may calculate multitouch input.

Figure 4:
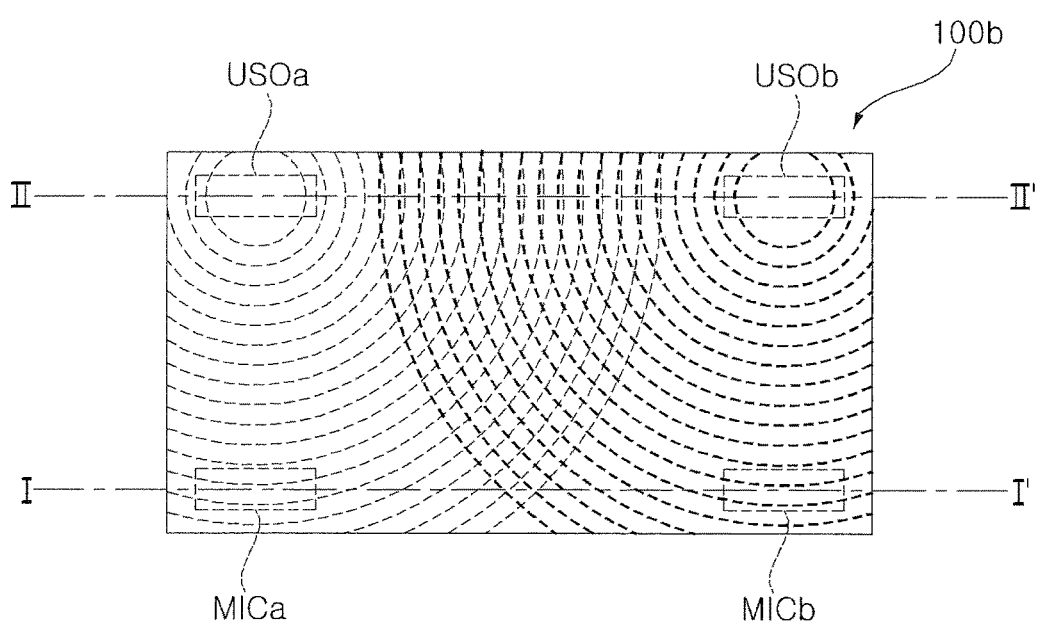
FIG. 4 is a diagram showing another example touch sensing apparatus based on ultrasonic waves.
Figure 5A:
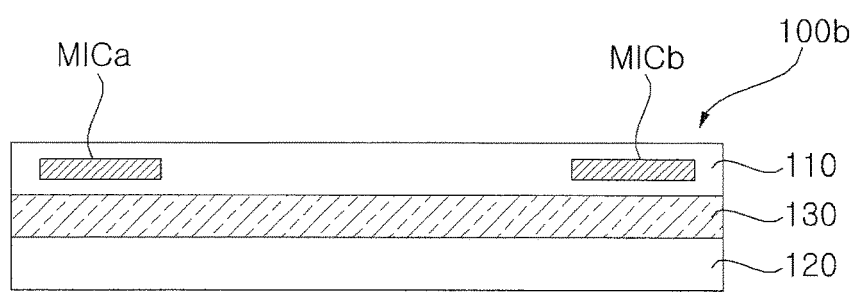
FIGS. 5a to 5b are side views showing the example touch sensing apparatus of FIG. 4.
Figure 5B:
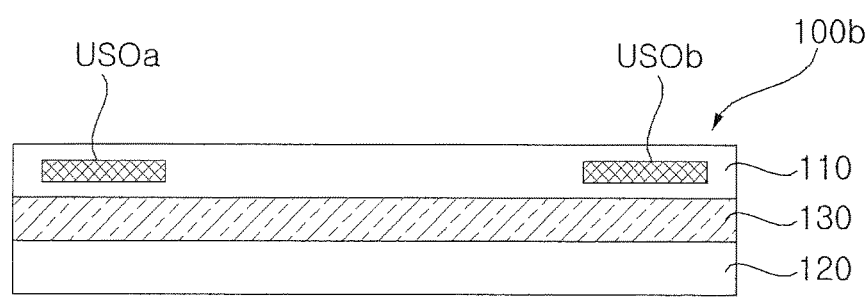

FIG. 4 is a diagram showing an example touch sensing apparatus based on ultrasonic waves, and FIGS. 5a to 5b are side views showing the example touch sensing apparatus based on ultrasonic waves of FIG. 4.

The touch sensing apparatus 100b based on ultrasonic waves of FIGS. 4 to 5b may include a first plate 110, a second plate 120 spaced apart from the first plate 110, a piezoelectric element 130 disposed between the first and second plates 110 and 120 to output an electrical signal in correspondence with touch input on the first plate 110, an ultrasonic output unit USO for outputting ultrasonic waves to the first plate 110, a plurality of microphones MICa to MICd, and a processor 170 for calculating the position of the touch input on the first plate 110 based on a changed sound signal corresponding to the touch input on the first plate 110.

Referring to FIG. 4, the plurality of microphones MICa to MICb in the touch sensing apparatus 100b based on ultrasonic waves may be disposed to be spaced apart from each other at the lower end of the first plate 110 and the plurality of ultrasonic output units USOa and USOb may be disposed to be spaced apart from each other at the upper end of the first plate 110.

For example, as shown in the figure, two microphones MICa to MICb may be provided near the lower corners to be spaced apart from each other and two ultrasonic output units USOa and USOb may be provided near the upper corners to be spaced apart from each other.

FIG. 5a is a side view showing the touch sensing apparatus 100b based on ultrasonic waves taken along line I-I' of FIG. 4. Referring to FIG. 5a, the plurality of microphones MICa to MICb is located in the first plate 110.

The first plate 110 may be a case of the touch sensing apparatus 100b based on ultrasonic waves and may be made of various materials such as ceramic, tempered glass, etc.

The second plate 120 may be spaced apart from the first plate 110 and may be made of various materials such as ceramic, tempered glass, etc.

The piezoelectric element 130 may be disposed between the first and second plates 110 and 120 and output an electrical signal corresponding to pressure using piezoelectric effects.

The piezoelectric element 130 may generate a voltage by applied force. The level of the voltage may be changed according to the intensity of applied force.

For example, the piezoelectric element 130 may include a ferroelectric material such as lead zirconate titanate [Pb(Ti, Zr)O3] (PZT), barium titanate (BaTiO3), etc.

FIG. 5b is a side view of the touch sensing apparatus 100b based on ultrasonic waves taken along line II-II' of FIG. 4. Referring to FIG. 5b, the plurality of ultrasonic output units USOa and USOb may be located in the first plate 110.

The plurality of ultrasonic output units USOa and USOb may output different ultrasonic waves, e.g., ultrasonic waves having different frequencies or different phases.

For example, the plurality of ultrasonic output units USOa and USOb may output ultrasonic waves with a frequency from several tens of kHz to several MHz higher than an audible frequency that is from 20 to 20,000 Hz.

The ultrasonic wave output from the ultrasonic output unit USO may be changed by the electrical signal output from the piezoelectric element 130 and the plurality of microphones MICa to MICb may collect the changed ultrasonic waves.

For example, as the intensity of touch input on the first plate 110 increases, the level of the electrical signal output from the piezoelectric element 130 such as the level of the voltage, for instance, may increase and thus change in ultrasonic wave may increase.

The processor 170 may calculate the position of touch input on the first plate 110 based on the changed sound signals (e.g., ultrasonic signals) collected by the plurality of microphones MICa to MICb.

The processor 170 may calculate the position of touch input on the first plate 110 based on the changed sound signals collected by the plurality of microphones MICa to MICb.

For example, the processor 170 may calculate the position of the touch input on the first plate 110 based on a difference in phase between the changed sound signals collected by the plurality of microphones MICa to MICb.

In some implementations, the processor 170 may calculate the position of touch input on the first plate 110 based on a difference in level and phase between the changed sound signals collected by the plurality of microphones MICa to MICb.

Accordingly, it is possible to conveniently calculate touch input through the touch sensing apparatus 100b based on ultrasonic waves.

In particular, unlike a capacitive touch sensing method, it is possible to conveniently and accurately calculate touch input by a wet hand using ultrasonic waves. Accordingly, it is possible to increase user convenience.

The touch sensing apparatus 100b based on ultrasonic waves may calculate pressure generated when a specific object is laid thereon, and a pressure generation position, in addition to touch input by a finger.

For example, if the touch sensing apparatus 100b based on ultrasonic waves is used for a cooking apparatus, it may be possible to calculate a pressure generated by a cooking vessel and a pressure generation position to calculate the position of the cooking vessel.

The processor 170 may perform control to display a portion of a display at a position corresponding to the calculated position of the touch input. Therefore, a user may intuitively recognize touch input.

The processor 170 may perform control to transmit the calculated position information of the touch input to an external device through a communication unit 135. In particular, by transmitting the position information of the calculated touch input or the pattern information of the touch input to an external device through wireless communication, it is possible to remotely control the external device. Accordingly, user convenience may be increased.

The touch sensing apparatus 110b based on ultrasonic waves of FIG. 4 may calculate touch input similarly to FIGS. 3a to 3d. In particular, multitouch input may be calculated.

Figure 6:
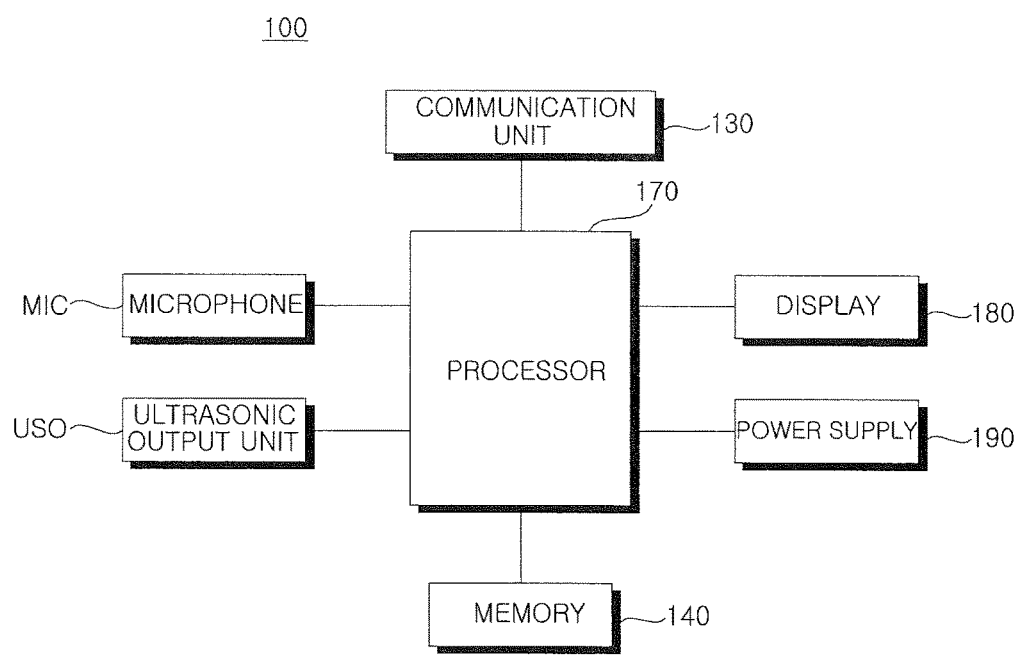
FIG. 6 is a block diagram showing an example internal configuration of the touch sensing apparatus of FIG. 1 or 4.

FIG. 6 is a block diagram showing an example internal configuration of the touch sensing apparatus based on ultrasonic waves of FIG. 1 or 4.

The touch sensing apparatus 100 or 110b based on ultrasonic waves of FIG. 6 may include a microphone MIC, an ultrasonic output unit USO, a communication unit 135, a memory 140, a processor 170, a display 180 and a power supply 190.

The microphone MIC may include a plurality of microphones and may collect sound signals, more particularly, ultrasonic signals.

The ultrasonic output unit USO may output an ultrasonic wave.

The ultrasonic output unit USO may output the ultrasonic wave based on the electrical signal output from the piezoelectric element 130 as shown in FIGS. 1 to 3d.

In some implementations, the ultrasonic output unit USO may output the ultrasonic wave separately from the piezoelectric element 130 as shown in FIGS. 4 to 5b.

The communication unit 135 may perform data exchange with an external device.

For example, the communication unit 135 may transmit the calculated position information of the touch input calculated by the processor 170 to the external device.

To this end, the communication unit 135 may perform communication through such as ZigBee, Wi-Fi, Bluetooth, etc.

For example, the calculated position information of the touch input may be transmitted to the external device such as a cooking apparatus, a TV, a mobile terminal, and etc. through a low-power Bluetooth Low Energy (BLE) communication.

The memory 140 may store a touch input pattern, a pressure pattern, etc. For example, by the touch input pattern such as the pressure pattern, an ultrasonic signal pattern collected by the microphone MIC may be stored.

The display 180 may display information on operation of the touch sensing apparatus 100 based on ultrasonic waves.

For example, the display 180 may perform control such that a portion of the display 180 is turned on and displayed at a position corresponding to the position of the touch input calculated by the processor 170.

The processor 170 may calculate the position of the touch input on the first plate 110 based on the sound signals collected by the plurality of microphones MICa to MICd of FIGS. 1 to 3d.

For example, the processor 170 may calculate the position of the touch input on the first plate 110 based on a difference in phase between the sound signals collected by the plurality of microphones MICa to MICd.

In some implementations, the processor 170 may calculate the position of touch input on the first plate 110 based on a difference in level and phase between the sound signals collected by the plurality of microphones MICa to MICd.

The processor 170 may perform control to display a portion of the display at the position corresponding to the calculated position of the touch input.

The processor 170 may also perform control to transmit the calculated position information of the touch input to an external device through the communication unit 135.

The processor 170 may calculate the position of the touch input on the first plate 110 based on the changed sound signals corresponding to the touch input on the first plate 110 and collected by the plurality of microphones MICa to MICb of FIGS. 4 to 5b.

In some implementations, the processor 170 may calculate the position of the touch input on the first plate 110 based on the changed sound signals in correspondence with a plurality of ultrasonic waves.

In some implementations, the processor 170 may calculate the position of the touch input on the first plate 110 based on the difference in phase between the sound signals collected by the plurality of microphones MICa to MICd.

The processor 170 may include a preprocessor 173 for performing noise reduction signal processing with the sound signals collected by the plurality of microphones MICa to MICd and an acoustic source localization unit 174 for calculating a sound source location based on the signal from the preprocessor 173.

The processor 170 may further include a calibration unit 176 for performing calibration with respect to the sound source location and an optimizer 177 for optimizing the calibrated sound source location.

Figure 7A:
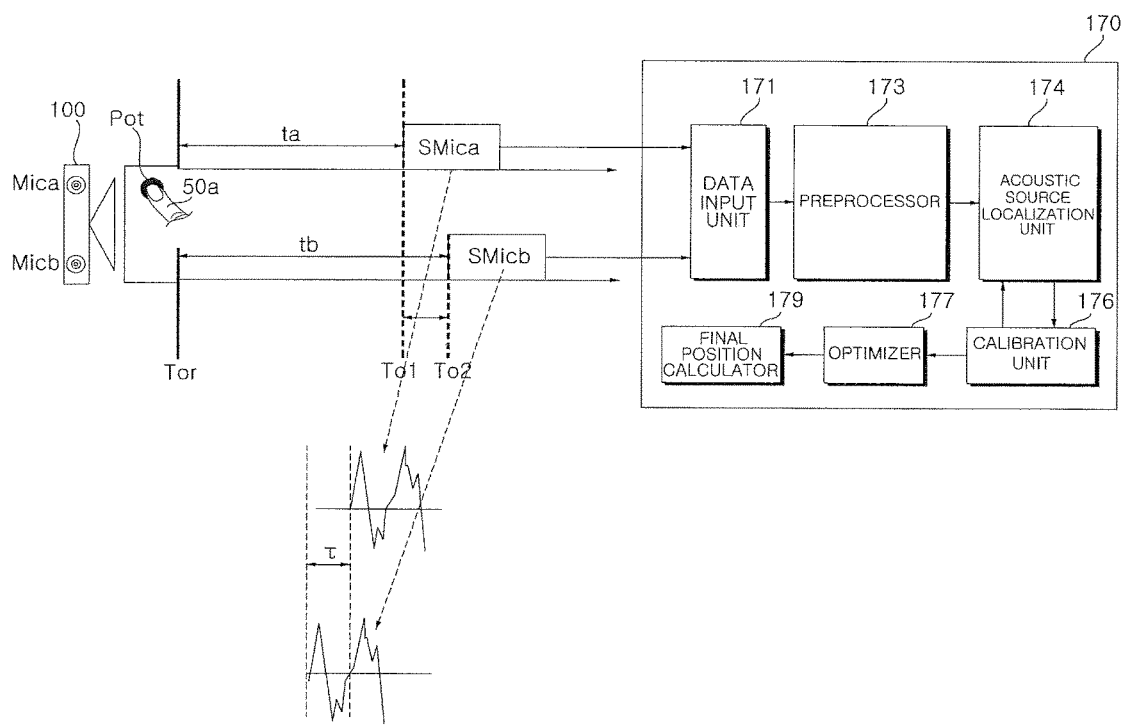
FIGS. 7a to 7b are views describing example operations of the example processor of FIG. 6.
Figure 7B:
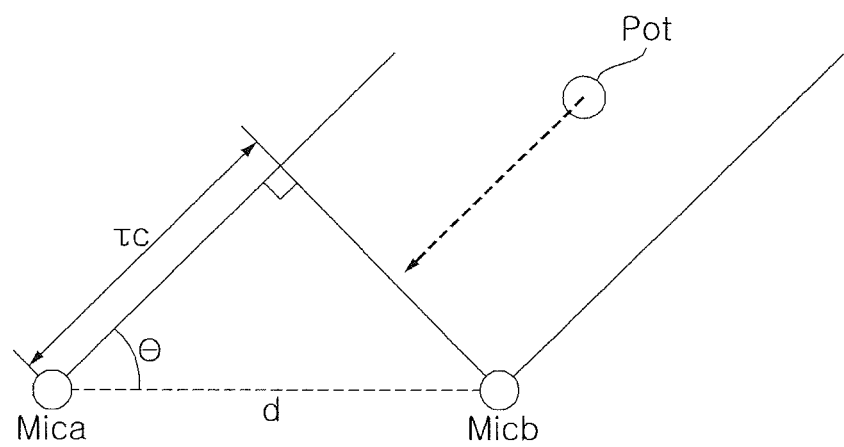

FIGS. 7a to 7b illustrates example operations of the processor of FIG. 6.

First, FIG. 7a shows an example case in which an touch input is generated at a first position Pot at a time Tor.

For example, an ultrasonic wave may be generated at the first position Pot, and ultrasonic waves SMica and SMicb are collected by a first microphone Mica and a second microphone Micb.

The ultrasonic wave SMica may be collected by the first microphone Mica at the time To1 and the ultrasonic wave SMicb may be collected by the second microphone Micb at the time To2 later than the time To1 by T.

The ultrasonic waves SMica and SMicb may be delivered to the processor 170.

A data input unit 171 in the processor 170 may receive sampled data signals in correspondence with the ultrasonic waves SMica and SMicb.

The data input unit 171 may receive the data signals obtained by sampling the sound signals, more particularly, the ultrasonic signals, and may perform filtering, for instance.

Next, the preprocessor 173 may receive the signal from the data input unit 171 and perform noise reduction processing. The noise reduction processing may be performed to minimize malfunction caused due to peripheral noises.

Next, the acoustic source localization unit 174 may calculate the acoustic source location of sound. For example, the acoustic source location may be calculated using a time difference of arrival (TDOA) method.

In detail, the acoustic source localization unit 174 may calculate the acoustic source location based on the difference in phase between the sound signals collected by the plurality of microphones or the difference in level and phase between the collected sound signals. The pattern data stored in the memory 140 may be used.

FIG. 7b is a diagram illustrating an example method of calculating an acoustic source location, more particularly, an angle, based on the position Pot.

The processor 170 may calculate the angle information of the acoustic source location using Equation 1 below.

$$\theta = \cos^{-1}\left(\frac{c\tau/F_s}{d}\right) \quad \text{[Equation 1]}$$

where, $\theta$ denotes the angle of the acoustic source location, $\tau$ denotes a difference in phase or time between sound signals, Fs denotes a sampling frequency, c denotes the speed of an ultrasonic wave, and d denotes a distance between a first microphone MICa and a second microphone MICb.

The processor 170 may calculate distance information of the acoustic source location information in consideration of the level of the collected ultrasonic signal.

For example, the level of the acoustic signal may increase with decreasing distance from the acoustic source location and decrease with increasing distance from the acoustic source location.

Next, the calibration unit 176 may perform calibration with respect to the calculated acoustic source location in consideration of the properties of the medium of the first plate 110.

Next, the optimizer 177 may optimize the acoustic source location. For example, a pattern recognition algorithm may be performed.

Next, the final location calculator 179 may finally calculate and output a touch input position (angle and distance information) based on the data processed by the optimizer.

The touch sensing apparatus 100 or 100b based on ultrasonic waves described with reference to FIGS. 1 to 7b is applicable to various apparatuses.

For example, the touch sensing apparatus 100 or 100b based on ultrasonic waves is applicable to home appliances such as a cooking apparatus, a refrigerator, a washing machine, an air conditioner, an air cleaner and a cleaner.

As another example, the touch sensing apparatus 100 or 100b based on ultrasonic waves may be applicable to a laptop, a mobile terminal, a tablet, etc.

In addition, the touch sensing apparatus 100 or 100b based on ultrasonic waves may be mounted on a door, a table, a sink or a bathtub.

Hereinafter, various apparatuses including the touch sensing apparatus 100 or 100b based on ultrasonic waves will be described.

Figure 8:
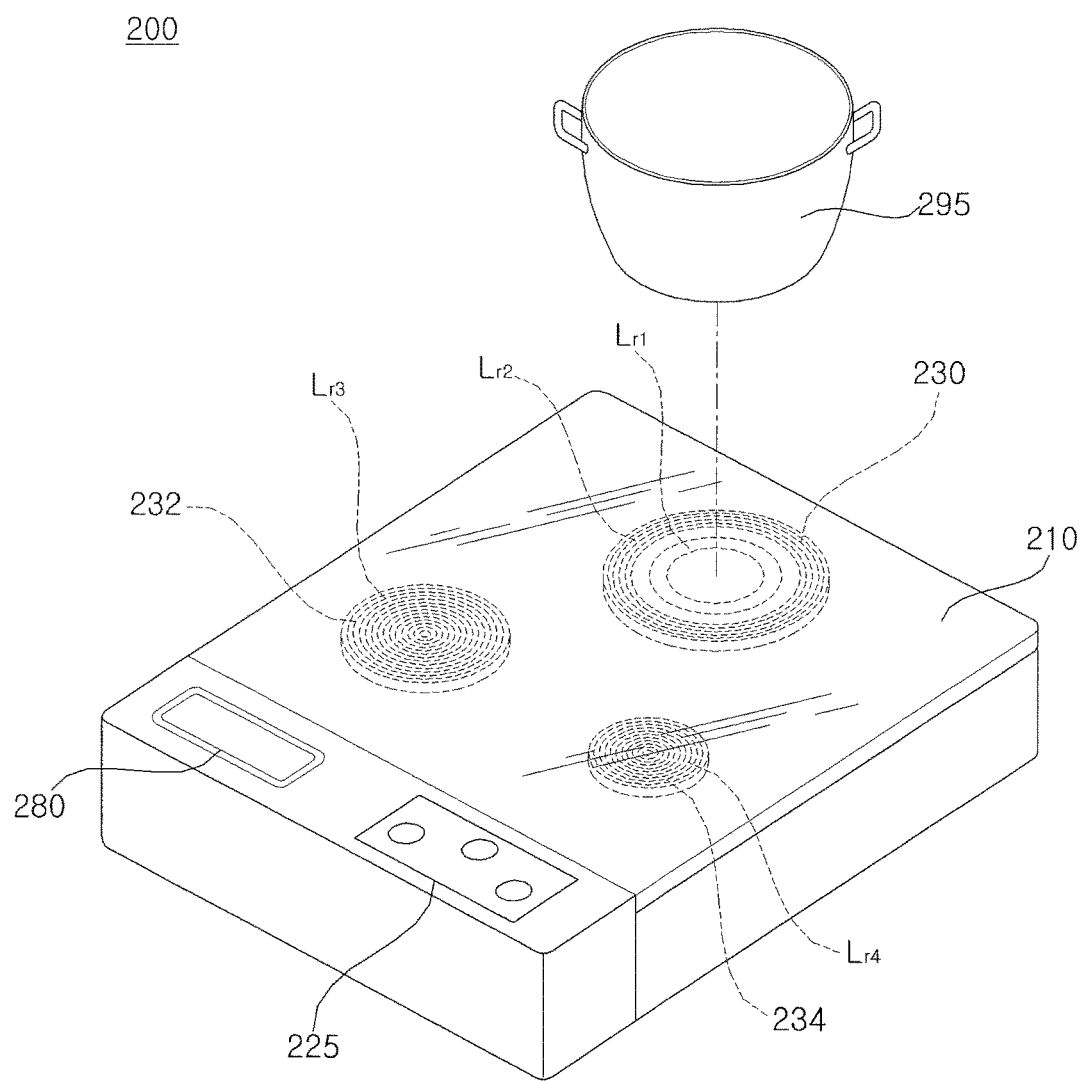
FIG. 8 is a perspective view showing an example cooking apparatus.

FIG. 8 is a perspective view showing an example cooking apparatus.

Referring to FIG. 8, the example cooling apparatus 200 includes the touch sensing apparatus 100 or 100b based on ultrasonic waves described with reference to FIGS. 1 to 7b and may be an induction heating (IH) cooking apparatus.

The IH cooking apparatus 200 of FIG. 8 may include a heating plate 210, a first heater 230, a second heater 232, a third heater 234, an input unit 225 and a display 280.

The heating plate 210 may be a case of the IH cooking apparatus 200 and provided on the heaters. The heating plate 110 may be made of various materials such as ceramic or tempered glass.

A cooking vessel may be placed on the heating plate 210 and the cooking vessel 295 is placed on at least one of the heaters 330, 332 and 334 and is heated by the principle of induction heating.

The first heater 230 may include a plurality of induction heating coils and a resonance capacitor.

Referring to FIG. 8, the first heater 230 may include a first coil $L_{r1}$ and a second coil $L_{r2}$.

The first coil $L_{r1}$ may be an induction heating coil used to detect the temperature of the cooking vessel and the second induction heating coil $L_{r2}$ may be used to heat the cooking vessel.

The second induction heating coil $L_{r2}$ may be provided at the outer circumference of the first induction heating coil $L_{r1}$.

When an AC current or high-frequency AC current flows in the second induction heating coil $L_{r2}$ in a state in which the cooking vessel 295 is placed on the first heater 230, more particularly, the second induction heating coil $L_{r2}$, a magnetic field may be generated in the second induction heating coil $L_{r2}$ by resonance by the resonance capacitor and the second induction heating coil $L_{r2}$ and eddy current is induced in the cooking vessel 95 due to electromagnetic induction effect of the magnetic field. By the eddy current, Joule heat may be generated in a resistance component of the cooking vessel, thereby heating the cooking vessel.

The second heater 232 includes a third induction heating coil $L_{r3}$ and a resonance capacitor. When high-frequency AC current flows in a state in which the cooking vessel 295 is placed on the second heater 232, more particularly, the third induction heating coil $L_{r3}$, the cooking vessel 295 may be heated by eddy current as described above.

The third heater 234 includes a fourth induction heating coil $L_{r4}$ and a resonance capacitor. When high-frequency AC current flows in a state in which the cooking vessel 295 is placed on the third heater 234, more particularly, the fourth induction heating coil $L_{r4}$, the cooking vessel 295 may be heated by eddy current as described above.

The input unit 225 may receive a user input so as to operate the IH cooking apparatus 200. For example, whether at least one of the first heater 230, the second heater 232 and the third heater 234 is heated or to which of the first induction heating coil $L_{r1}$ and the second induction heating coil $L_{r2}$ of the first heater 230 current is supplied is determined or the operation time or temperature of each heater may be selected by user input.

The input unit 225 may be provided in each of the heaters 230, 232 and 234 as shown in the figure.

The display 280 displays the operation state of the IH cooking apparatus 200. Whether each of the heaters 230, 232 and 234 operates or the temperature of the cooking vessel 295 which is being heated may be displayed.

In addition to the IH heat cooking apparatus 200, since a radiant heat cooking apparatus uses a heater under a heating plate 210 similarly to the IH cooking apparatus 200, flame may not generated and thus stability is high. However, since the temperature of the heater may increase by radiant heat, on/off control may be necessary to protect the heater.

Since the IH cooking apparatus 200 may use the principle of high-frequency induction heating, the heater, more particularly, the induction heating coil, may not be directly heated. Since high-frequency current may be continuously supplied, high energy efficiency can be obtained and a heating time can be reduced.

Since the IH cooking apparatus 200 may efficiently perform induction heating with a cooking vessel made of a magnetic material including a metal component, an electrothermal heater may be further included in order to heat a cooking vessel made of a non-magnetic material. The electrothermal heater may be placed in at least one of the heaters 230, 232 and 234. The IH cooking apparatus 200 may further include a load detector for detecting the type of the cooking vessel.

Figure 9:
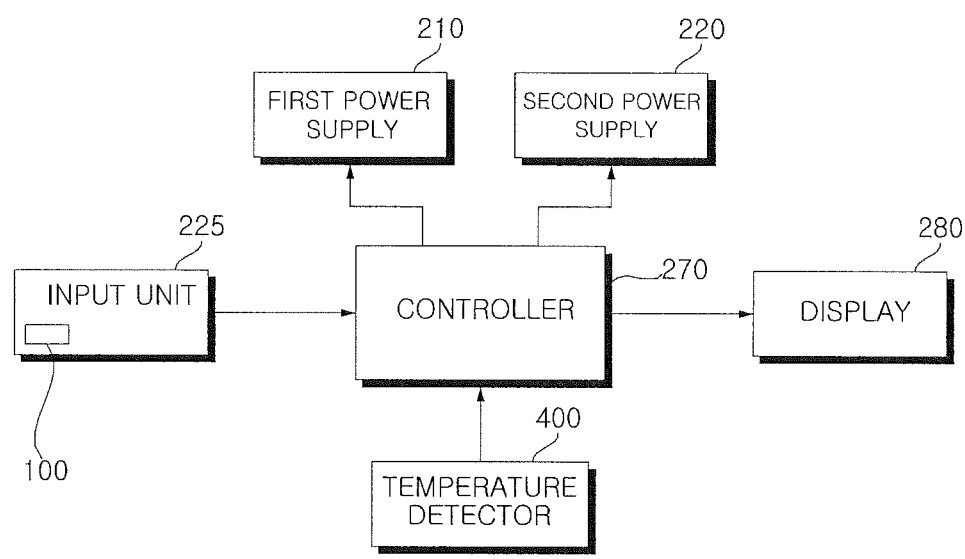
FIG. 9 is a block diagram showing an example of the internal configuration of the cooking apparatus of FIG. 8.

FIG. 9 is a block diagram showing an example of the cooking apparatus of FIG. 8.

The IH cooking apparatus 200 may include a first power supply 310, a second power supply 320, an input unit 225, a display 280 and a temperature detector 400.

The input unit 225 may include the touch sensing apparatus 100 or 110b based on ultrasonic waves described with reference to FIGS. 1 to 7b.

The first power supply 310 and the second power supply 320 may supply power to the plurality of induction heating coils of the cooking apparatus 200.

Figure 10:
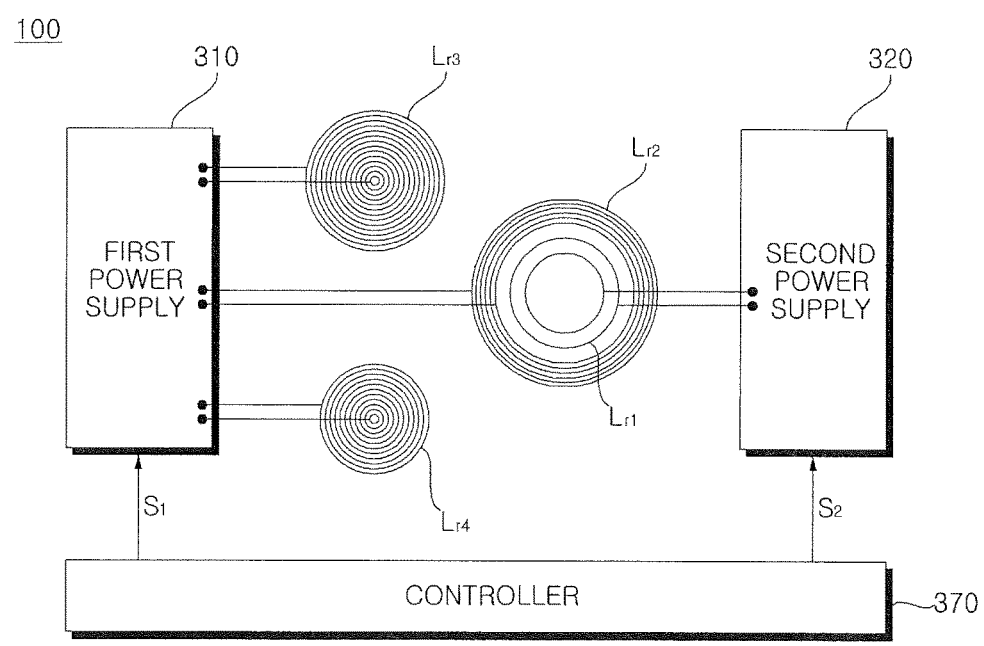
FIG. 10 is a diagram showing an example of supplying power to the cooking apparatus of FIG. 8.

In FIG. 10, the first power supply 310 may supply power to a second induction heating coil $L_{r2}$, a third induction heating coil $L_{r3}$ and a fourth induction heating coil $L_{r4}$ and the second power supply 320 supplies power to a first induction heating coil $L_{r1}$.

The input unit 225 may include buttons and a touchscreen related to operation of the cooking apparatus 200 and a signal input through the input unit 225 may be transmitted to the controller 270.

The display 280 may display information related to the operation state of the cooking apparatus 200. For example, a cooking time, a residual time, cooking type information and the temperature of a cooking vessel related to cooking may be displayed.

The temperature detector 400 may detect the temperature of the cooking vessel 295. For temperature detection, an IR sensor may be used. However, the present disclosure is not limited thereto and a method of using a resistor having a resistance value changed according to temperature may be used.

The processor 170 controls overall operation of the cooking apparatus 200.

For example, the controller 270 may control operations of the first power supply 310, the second power supply 320, the input unit 225, the display 280 and the temperature detector 400.

More specifically, the controller may control the first power supply 310 or the second power supply 320 in order to cook food according to a temperature signal input through the input unit 225.

The controller 270 may receive temperature information detected by the temperature detector 400 and perform control to display the temperature information on the display 280.

The controller 270 may perform control to apply a pulse signal to the first coil $L_{r1}$ and detect the temperature of the cooking vessel 295 based on current flowing in the resistor in correspondence with the pulse signal.

The controller 270 may perform control to continuously operate the second coil $L_{r2}$ and to repeatedly apply the pulse signal to the first coil $L_{r1}$, upon heating the cooking vessel 295.

The controller 270 may perform control to change the width of the pulse signal of the first coil $L_{r1}$ or the time for applying the pulse signal according to the operation time of the second coil $L_{r2}$ or temperature of the cooking vessel 295.

The plurality of coils $L_{r1}$ to $L_{r4}$ may be placed under the second plate 120.

The controller 270 may sense the position of a first pressure input on the first plate 110 based on the sound signals collected by the plurality of microphones MICa to MICd and perform control to flow current in the first coil when the position of the first pressure input corresponds to the first coil of the plurality of coils.

The controller 270 may perform control to turn on the display 280 located near the first coil when the position of the first pressure input corresponds to the first coil of the plurality of coils.

When a cooked material falls from the cooking vessel placed at the position corresponding to the first coil onto the first plate 110, the controller 270 may calculate second pressure input generated by the cooked material and perform control to decrease the intensity of current applied to the first coil based on the calculated second pressure input.

When a touch input on the first plate 110 is received, the controller 270 may calculate the touch input and set at least one of the period for applying current to the first coil and the intensity of current based on the touch input.

FIG. 10 is a diagram showing an example of supplying power to the IH cooking apparatus of FIG. 8.

Referring to FIG. 10, the IH cooking apparatus 200 may further include a first power supply 310 and a second power supply 320.

The first power supply 310 may supply power to a second induction heating coil $L_{r2}$ of the first heater 230, a third induction heating coil $L_{r3}$ of the second heater 232 and a fourth induction heating coil $L_{r4}$ of the third header 234. Here, power may be high-frequency AC power.

The second power supply 320 may supply power to the first induction heating coil $L_{r1}$ of the first heater 230.

Power may be supplied from different power supplies to the induction heating coils of the first heater 230, in which the plurality of induction heating coils is provided, such that the IH cooking apparatus using the high-frequency AC current can be efficiently and stably driven without power reduction.

Figure 11:
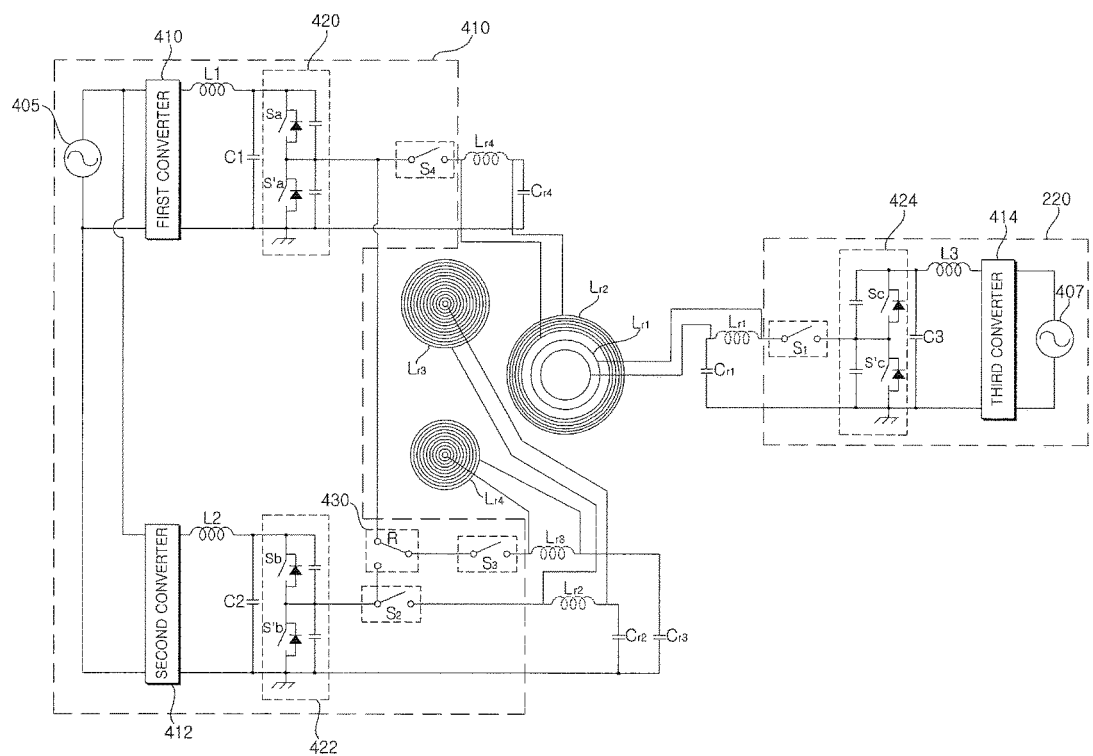
FIG. 11 is an example circuit diagram of the cooking apparatus of FIG. 10.

FIG. 11 is a circuit diagram showing an example of the IH cooking apparatus of FIG. 10.

Referring to the figure, the first power supply 310 may include a first converter 410, a second converter 412, a first reactor L1, a second reactor L2, a first smoothing capacitor C1, a second smoothing capacitor C2, a first inverter 420, a second inverter 422, a power selector 430 and second to fourth switching elements S2 to S4.

The second power supply 320 may include a third converter 414, a third reactor L3, a third smoothing capacitor C3, a third inverter 424 and a first switching element S1.

The first converter 410 and the second converter 412 may receive and convert voltages from a commercial AC power source 405 into DC voltages, respectively. For example, the first converter 410 and the second converter 412 may respectively include diodes to output the DC voltages rectified by the diodes.

The first converter 410 and the second converter 412 may respectively include diodes and switching elements and output DC voltages converted according to the rectification characteristics of the diodes and the switching operations of the switching elements.

Hereinafter, the first converter 410 and the second converter 412 respectively including the diodes without the switching elements will be focused upon.

The commercial AC power source 405 may be a single-phase AC power source or a three-phase AC power source. In the case of a single-phase AC power source, the first converter 410 and the second converter 412 may include four diodes in the form of a bridge. In the case of a three-phase AC power source, the first converter 410 and the second converter 412 may include six diodes.

The third converter 414 may receive and convert the commercial AC voltage into a DC voltage, as in the first converter 410 and the second converter 412. In order to prevent power reduction, the third converter 414 may receive a voltage from a separate commercial AC power 407.

The first reactor L1 and the second reactor L2 are respectively connected to one ends of the first converter 410 and the second converter 412 to serve to accumulate energy of an AC component, thereby eliminating a harmonic current component or a noise component.

The third reactor L3 is connected to one end of the third converter 414 to serve to accumulate energy of an AC component, thereby eliminating a harmonic current component or a noise component.

The first smoothing capacitor C1 and the second smoothing capacitor C2 are respectively connected to output terminals of the first converter 410 and the second converter 412. In the figure, the reactors L1 and L2 are disposed between the capacitors and the converters 410 and 415.

The first smoothing capacitor C1 and the second smoothing capacitor C2 may smooth the rectified voltages output from the first converter 410 and the second converter 412 into DC voltages. Hereinafter, the output terminals of the first converter 410 and the second converter 412 are referred to as first and second dc ends, respectively. The smoothed DC voltages of the first and second dc ends are applied to the first converter 410 and the second converter 412, respectively.

The third capacitor C3 is connected to the output terminal of the third converter 414 and smooths the rectified voltage output from the third converter 412 into a DC voltage. The output terminal of the third converter is referred to as a third dc end.

Each of the first inverter 420, the second inverter 422 and the third inverter 424 includes a plurality of switching elements and converts the smoothed DC voltage into an AC voltage having a predetermined frequency by on/off operation of the switching elements.

The first inverter 420 includes an upper arm switching element Sa and a lower arm switching element S'a connected in series. A diode may be connected in anti-parallel to each switching element Sb or S'b. In addition, a snubber capacitor may be connected to each switching element Sa or S'a in parallel.

The switching elements Sa and S'a of the first inverter 420 may perform on/off operation based on a first switching control signal from a controller. The switching elements Sa and S'a may complementarily operate.

The second inverter 422 may include an upper arm switching element Sb and a lower arm switching element S'b connected in series, similarly to the first inverter 420. A diode is connected in anti-parallel to each switching elements Sb or S'b. In addition, a snubber capacitor may be connected to each switching element Sb or S'b in parallel.

The switching elements Sb and S'b of the first inverter 420 perform on/off operation based on a second switching control signal from the controller.

The first inverter 420 and the second inverter 422 may separately perform operation. That is, the first and second inverter may generate and output first and second high-frequency AC voltages, respectively.

The third inverter 424 may include an upper arm switching element Sc and a lower arm switching element S'c connected in series, similarly to the first inverter 420. In addition, a diode and a snubber capacitor may be further connected.

The fourth resonance capacitor $C_{r4}$ may be connected to the second induction heating coil $L_{r2}$, for resonance. The high-frequency AC voltage may be supplied to the second induction heating coil $L_{r2}$ to induce heating according to the principle of induction heating. A switching element S4 for determining operation of the second induction heating coil $L_{r2}$ may be connected to the second induction heating coil $L_{r2}$.

A first AC voltage may be supplied from the first inverter 420 to the second induction heating coil $L_{r2}$.

The third induction heating coil $L_{r3}$ and the fourth induction heating coil $L_{r4}$ may be connected in parallel to form a pair. A second resonance capacitor $C_{r2}$ and a third resonance capacitor $C_{r3}$ may be connected to the third induction heating coil $L_{r3}$ and the fourth induction heating coil $L_{r4}$, for resonance. High-frequency AC voltages may be supplied to the induction heating coils $L_{r2}$ and $L_{r3}$ to induce heating according to the principle of induction heating. The switching elements S2 and S3 for determining operation of the induction heating coils $L_{r2}$ and $L_{r3}$ may be connected to the third induction heating coil $L_{r3}$ and the fourth induction heating coil $L_{r4}$, respectively.

A first AC voltage from the first inverter 420 or a second AC voltage from the second inverter 422 is supplied to the third induction heating coil $L_{r3}$ and the fourth induction heating coil $L_{r4}$. To this end, the power selector 430 may perform a switching operation.

The power selector 430 selects and supplies any one of the first AC voltage from the first inverter 420 and the second AC voltage from the second inverter 422 to the third induction heating coil $L_{r3}$ and supplies the other to the fourth induction heating coil $L_{r4}$, when both the third induction heating coil $L_{r3}$ and the second induction heating coil $L_{r2}$ operate.

For example, the second AC voltage may be supplied to the third induction heating coil $L_{r3}$ and the first AC voltage may be supplied to the fourth induction heating coil $L_{r4}$.

In some implementations, when ten or more of the plurality of induction heating coils are connected to the same inverter in parallel and turned on, the AC voltages applied to the induction heating coils may be separated. That is, AC voltages may be supplied from different inverters. Therefore, since the same inverter does not supply the same AC voltage, power reduction does not occur and the AC voltages can be stably supplied.

In some cases, the power selector 430 may include a relay element. In FIG. 11, an example relay element R is included.

The relay element R may be disposed between the inverters 420 and 422 and the fourth induction heating coil $L_{r4}$ to perform relay operation, such that the fourth induction heating coil $L_{r4}$ is connected to any one of the first inverter 420 and the second inverter 422.

Relay operation of the relay element R may be controlled by a control signal of a controller.

The first resonance capacitor $C_{r1}$ may be connected to the first induction heating coil $L_{r1}$, for resonance. A high-frequency AC voltage may be supplied to the first induction heating coil $L_{r1}$ to induce heating according to the principle of induction heating. The switching element S1 for determining operation of the first induction heating coil $L_{r1}$ may be connected to first induction heating coil $L_{r1}$.

A third AC voltage from the third inverter 424 may be supplied to the first induction heating coil $L_{r1}$.

The controller may control operation of the switching elements Sa and S'a of the first inverter 420, the switching elements Sb and S'b of the second inverter 422, the switching elements Sc and S'c of the third inverter 424, the relay element R of the power selector 430 and the first to fourth switching elements S1 to S4 for operation of the induction heating coils.

For example, for control of the first inverter 420, the second inverter 422 and the third inverter 424, a pulse width modulation (PWM) switching control signal may be output. When the switching elements of the first inverter 420, the second inverter 422 and the third inverter 424 are insulated gate bipolar transistors (IGBTs), PWM gate drive control signals may be output.

The controller may receive respective values from a temperature sensor for sensing the temperature of the vicinity of each induction heating coil and an input current detector for detecting input current from the commercial AC power source, and stop overall operation of the IH cooking apparatus 200 upon abnormal operation.

Figure 12A:
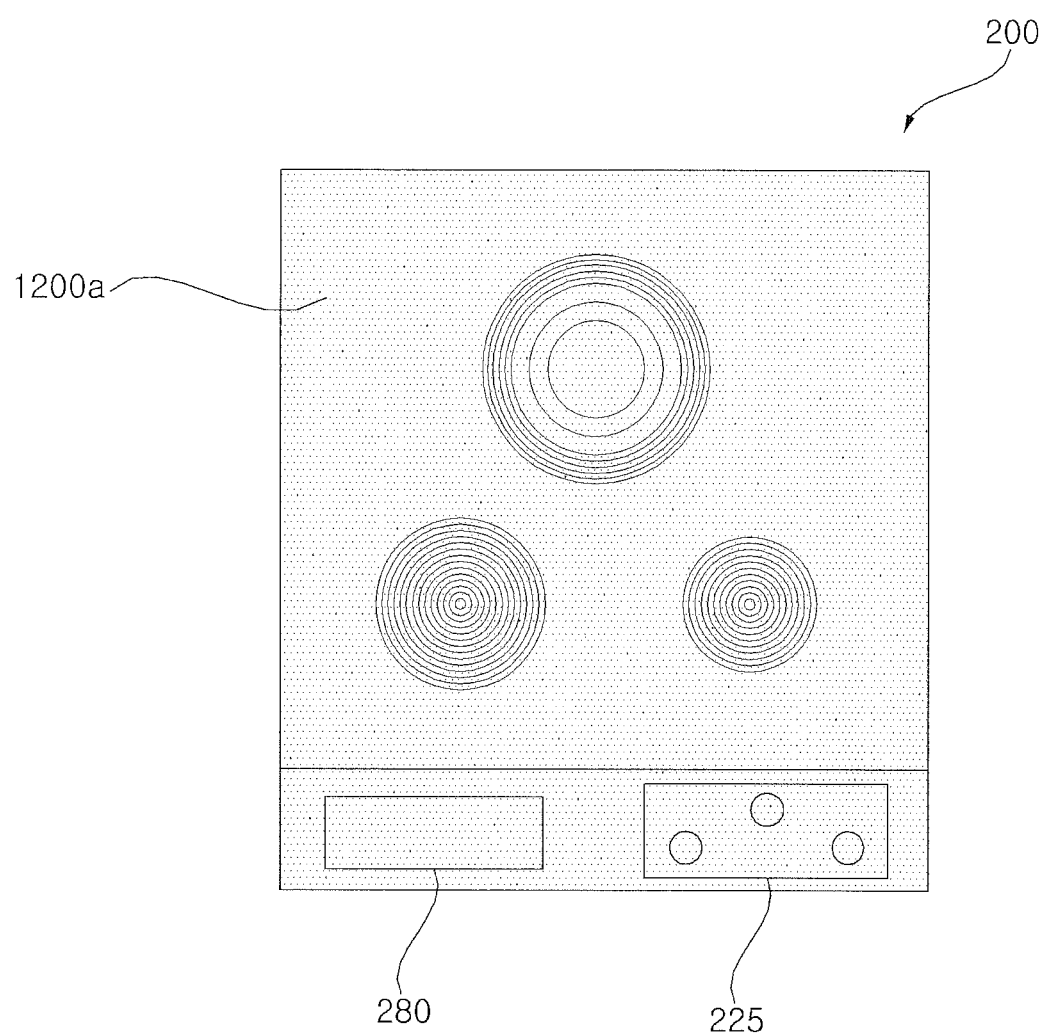
FIGS. 12a to 12d are views describing example operations of the cooking apparatus of FIG. 8.
Figure 12B:
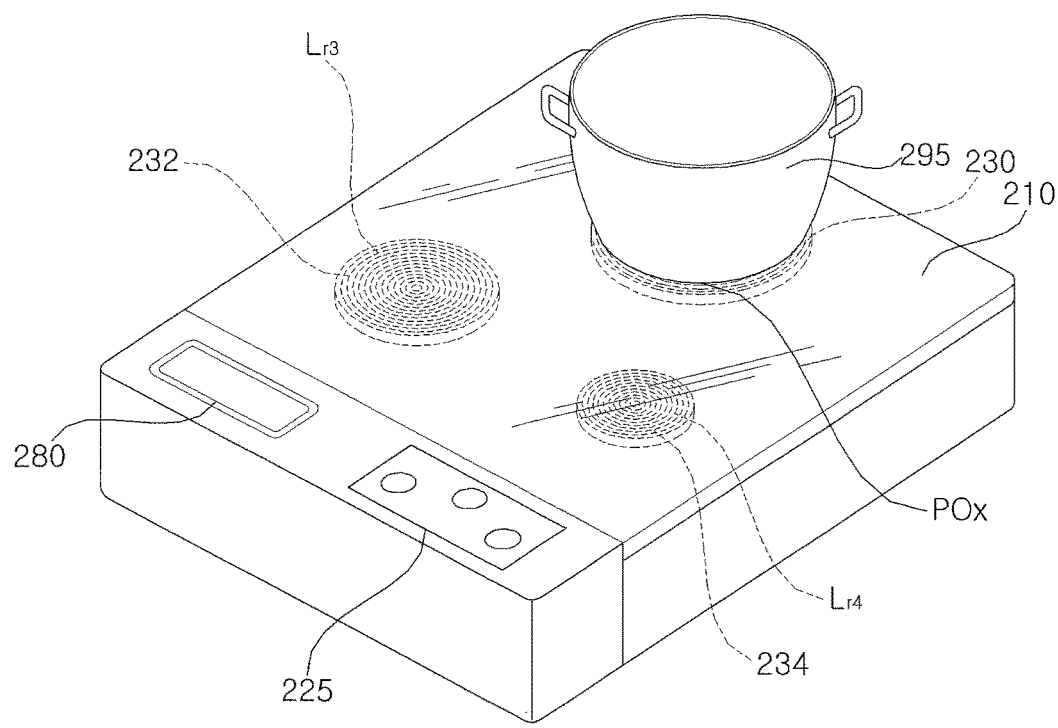

FIGS. 12*a* to 12*b* illustrates example operations of the cooking apparatus of FIG. 8.

First, FIG. 12*a* shows an example touch sensible region 1200*a* of the upper plate 110 of the cooking apparatus 200.

That is, in the touch sensing apparatus 100 or 110*b* based on ultrasonic waves of FIGS. 1 to 7*b*, touch may be calculated not only in the region of the display 280 and the region of the input unit 225 but also in the region in which the induction heating coil is placed.

Therefore, a variety of user touch input may be possible and thus user convenience may be improved.

Next, FIG. 12*b* shows an example cooking vessel 295 placed on the first coil $L_{r1}$ of the plurality of coils $L_{r1}$ to $L_{r4}$.

By the touch sensing apparatus 100 or 110*b* based on ultrasonic waves of FIGS. 1 to 7*b*, the controller 270 may calculate the position of first pressure input on the first plate 110 and perform control to flow current in the first coil $L_{r1}$ when the position of the first pressure input is a position Pox corresponding to the first coil $L_{r1}$ of the plurality of coils $L_{r1}$ to $L_{r4}$.

By placing the cooking vessel 295 at the position corresponding to the first coil $L_{r1}$ without an input operation, it may be possible to automatically cook food. Accordingly, user convenience may be increased.

In some implementations, the cooking apparatus 200 may include a plurality of displays each of which is located near the plurality of coils $L_{r1}$ to $L_{r4}$. In this case, the controller 270 may perform control to turn on the display 280 near the first coil $L_{r1}$ when the position of the first pressure input is a position Pox corresponding to the first coil $L_{r1}$ of the plurality of coils $L_{r1}$ to $L_{r4}$. Therefore, a user can intuitively check that the first coil $L_{r1}$ is operating.

In some implementations, the controller 270 may perform control to turn on a region corresponding to the first coil $L_{r1}$ of the input unit 225 when the position of the first pressure input is a position Pox corresponding to the first coil $L_{r1}$ of the plurality of coils $L_{r1}$ to $L_{r4}$. Therefore, it is possible to prompt a user to manipulate a button corresponding to the region of the input unit 225.

Figure 12C:
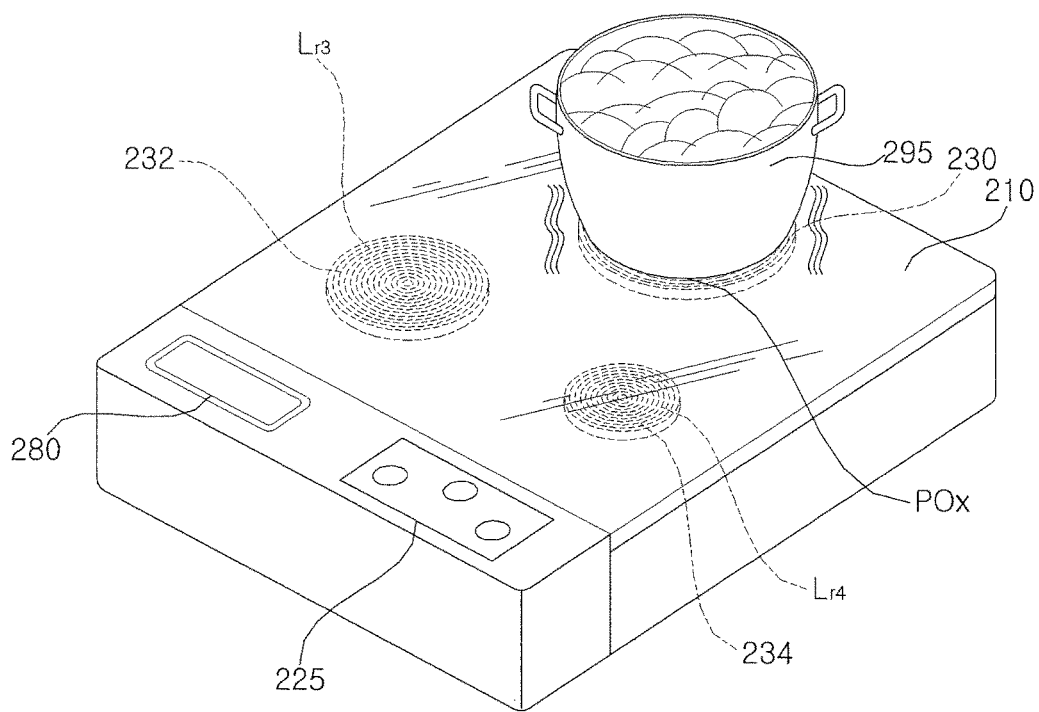

Next, FIG. 12c shows an example state in which a cooked material in the cooking vessel 295 is boiling.

In some implementations, the controller may control an intensity of the current to the first coil based on a change of the first pressure input or an additional pressure input applied on the first plate.

For example, the controller 270 may recognize that the cooked material in the cooking vessel 295 boils, when the position of the first pressure input is a position Pox corresponding to the first coil $L_{r1}$ of the plurality of coils $L_{r1}$ to $L_{r4}$ and the waveform of the output ultrasonic wave is pulsated.

Then, the controller 270 may automatically perform control to decrease the intensity of current flowing in the first coil $L_{r1}$ or stop flowing current in the first coil $L_{r1}$. Therefore, it may be possible to stably cook food.

In some implementations, the controller 270 may perform control to output sound indicating that the cooked material is boiling through an acoustic output module.

Figure 12D:
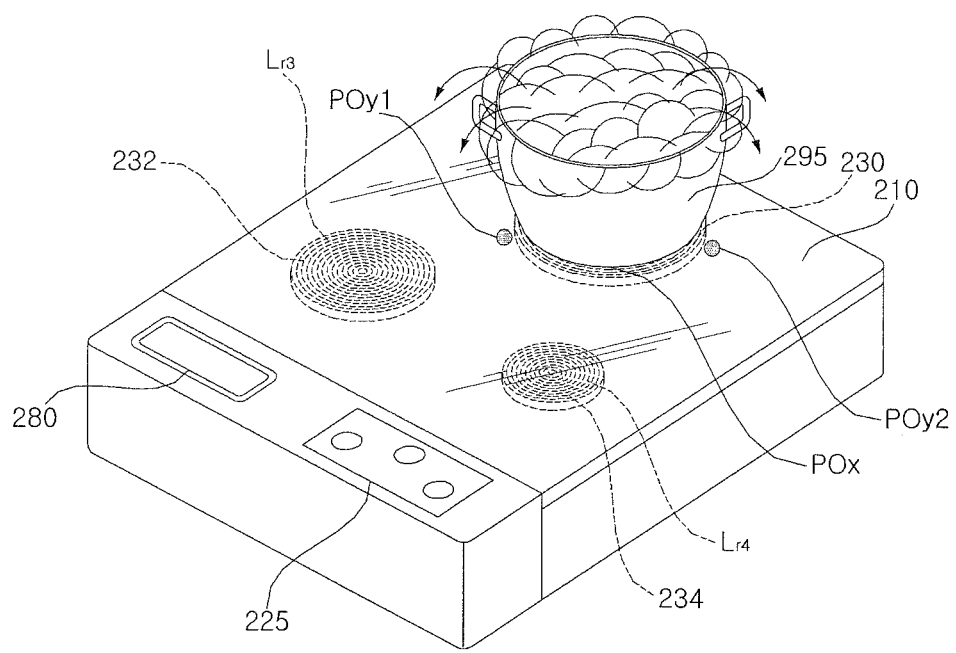
Figure 12D:
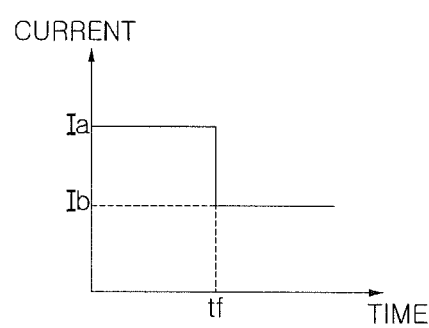

Next, FIG. 12d shows an example state in which the cooked material flows from the cooking vessel 295 onto the plate 110.

The controller 270 may calculate second pressure input by the cooked material when the cooked material falls from the cooking vessel 295 placed at the position Pox corresponding to the first coil $L_{r1}$ onto the first plate 110 and perform control to decrease the intensity of current applied to the first coil $L_{r1}$ based on the calculated second pressure input.

In the figure, the cooked material falls at positions POy1 and POy2 near the position Pox corresponding to the first coil $L_{r1}$.

Therefore, the ultrasonic waves may be generated at the positions POy1 and POy2 and the controller 270 may calculate the cooked material at the positions POy1 and POy2 based on sound calculated through the microphone.

The controller 270 may automatically perform control to decrease the intensity of current flowing in the first coil $L_{r1}$ based on the calculated cooked material or not to flow current in the first coil $L_{r1}$. Therefore, it may be possible to stably cook food.

In some implementations, the controller 270 may perform control to output sound indicating that the cooked material overflows through an acoustic output module.

The touch sensing apparatus 100 or 100b based on ultrasonic waves of FIGS. 1 to 7b may be attachable or detachable to or from a specific apparatus.

FIGS. 13a to 14c are diagrams showing various example home appliances including the touch sensing apparatus based on ultrasonic waves.

Figure 13A:
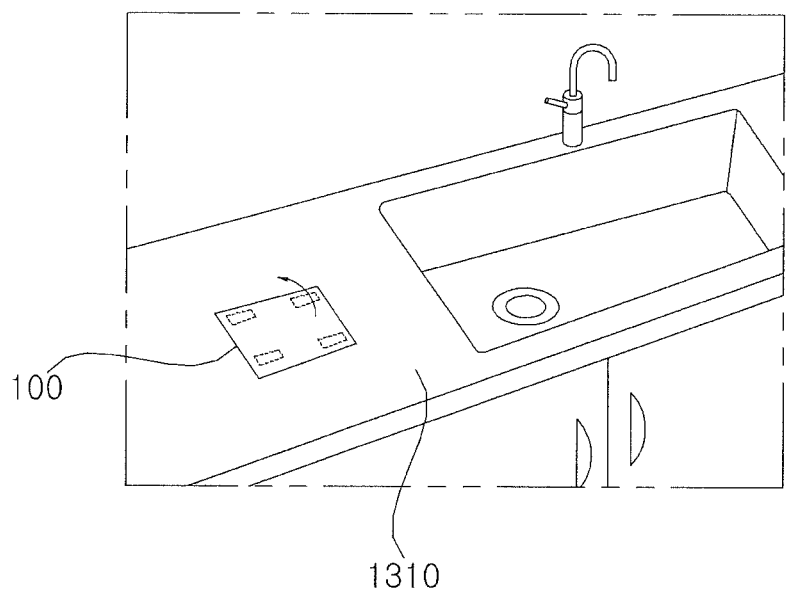
FIGS. 13a to 14c are diagrams showing example home appliances including the touch sensing apparatus of FIG. 1 or 4.

FIG. 13a shows an example cooking table 1310 including the touch sensing apparatus 100 based on ultrasonic waves. Touch input by a wet hand may be possible for the cooking table 1310.

Figure 13B:
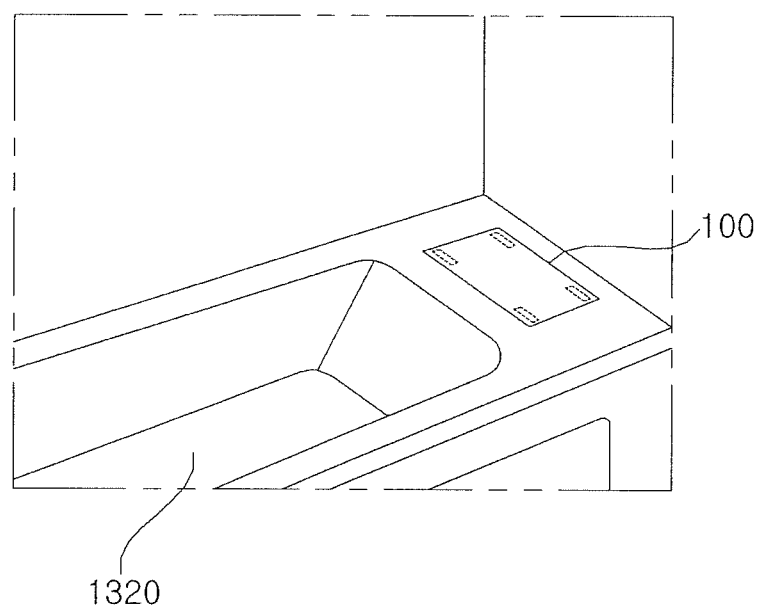

FIG. 13b shows an example bathtub 1320 including the touch sensing apparatus 100 based on ultrasonic waves. Touch input by a wet hand may be possible for the bathtub 1320.

Figure 13C:
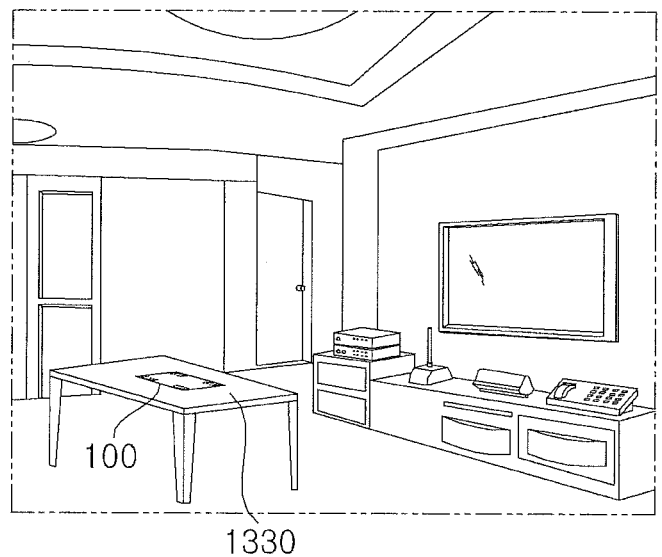

FIG. 13c shows an example table 1330 in a living room including the touch sensing apparatus 100 based on ultrasonic waves. Touch input is possible for the table 1330. For example, the calculated touch input may be transmitted to a TV through wireless communication, thereby remotely controlling the TV using the touch sensing apparatus 100 based on ultrasonic waves.

Figure 14A:
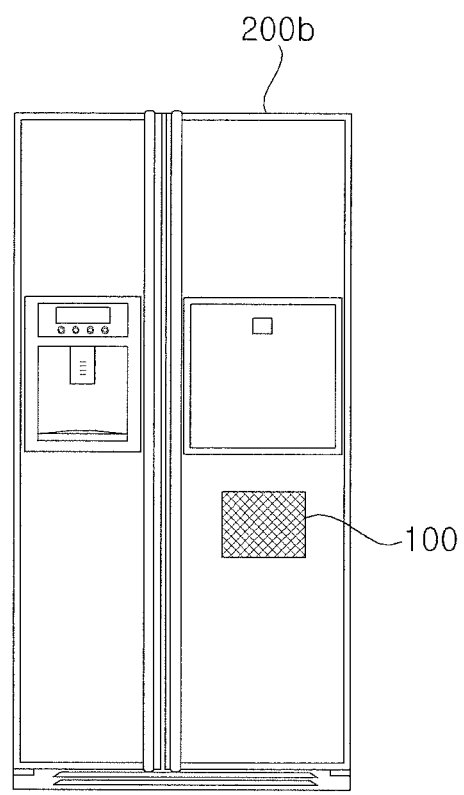

FIG. 14a shows an example door of a refrigerator 200b including the touch sensing apparatus 100 based on ultrasonic waves. Touch input may be calculated, and the door may be automatically opened according to a specific pattern input or touch input. In addition, it may be possible to control an operation of the refrigerator 200b.

Figure 14B:
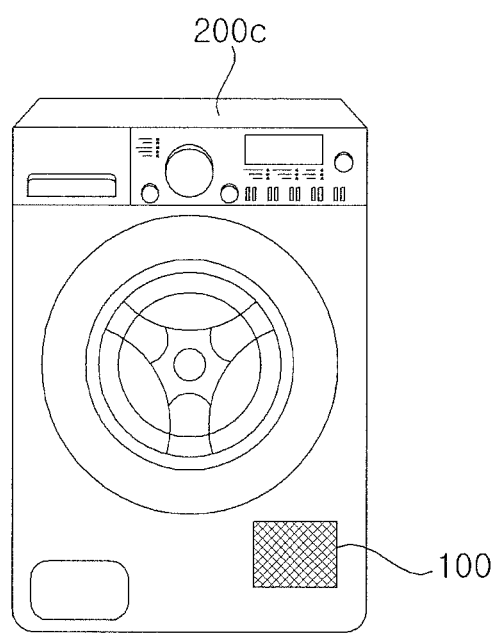

FIG. 14b shows an example washing machine 200c including the touch sensing apparatus 100 based on ultrasonic waves on its front frame. Touch input may be calculated, and the door may be automatically opened according to specific pattern input or touch input. In addition, it may be possible to control operation of the washing machine 200c.

In some implementations, the touch sensing apparatus 100 based on ultrasonic waves may be attached to the door of the washing machine 200c.

Figure 14C:
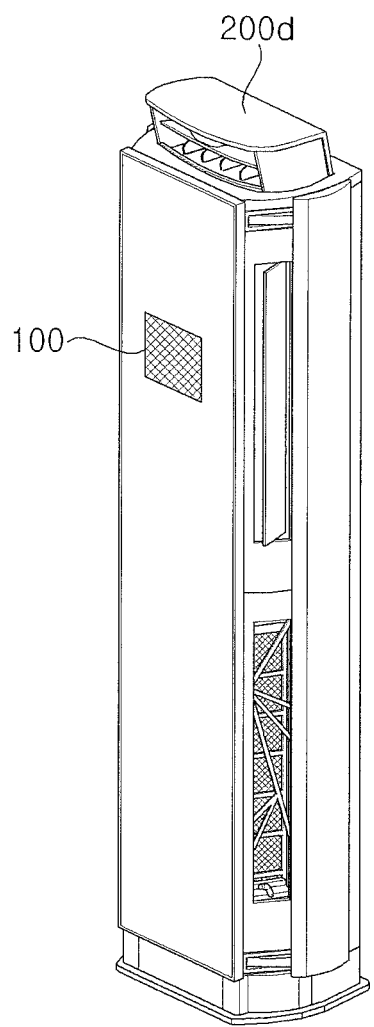

Next, FIG. 14c shows an example air conditioner 200d including the touch sensing apparatus 100 based on ultrasonic waves on its front frame. Touch input may be calculated, and the air conditioner may automatically operate according to a specific pattern input or touch input.

In some implementations, the touch sensing apparatus based on ultrasonic waves and the cooking apparatus and the home appliance including the same may include a first plate, a second plate spaced apart from the first plate, a piezoelectric element disposed between the first and second plates to output an electrical signal in correspondence with touch input on the first plate, an ultrasonic output unit to output an ultrasonic wave based on the electrical signal from the piezoelectric element, a plurality of microphones to receive the ultrasonic wave, and a processor to calculate a position of the touch input on the first plate based on sound signals collected by the plurality of microphones. Therefore, it may be possible to conveniently calculate touch input.

For example, it may be possible to conveniently and accurately calculate touch input by a wet hand, which may increase user convenience.

A portion of a display may display a visual indicator at a position corresponding to the touch input, thereby intuitively recognizing the touch input.

In case the cooking apparatus is an induction heating type apparatus including an induction coil, the position of first pressure input on the first plate may be calculated. When the first pressure input is at a position corresponding to the first coil among the plurality of coils, a current may flow in the first coil, thereby conveniently starting cooking.

In case a cooking vessel is placed at a position corresponding to the first coil, the position of the first pressure input may be calculated to enable a current to flow in the first coil, thereby conveniently starting cooking.

In some implementations, the display located near the first coil may be turned on, thereby intuitively checking operation of the first coil in the induction heating method.

When a cooked material overflows from the cooking vessel onto the first plate, a second pressure input by the cooked material may be calculated and the intensity of current applied to the first coil may be controlled to be reduced based on the calculated second pressure input, thereby stably cooking food.

The touch sensing apparatus based on ultrasonic waves and the cooking apparatus and the home appliance including the same may include a first plate, a second plate spaced apart from the first plate, a piezoelectric element disposed between the first and second plates to output an electrical signal in correspondence with touch input on the first plate, an ultrasonic output unit to output an ultrasonic wave to the first plate, a plurality of microphones, and a processor to calculate a position of the touch input on the first plate based on a changed sound signal corresponding to the touch input on the first plate.

For example, it may be possible to conveniently and accurately calculate touch input by a wet hand, which may increase user convenience.

The touch sensing apparatus based on ultrasonic waves and the cooking apparatus and the home appliance including the same may not be limited to configurations and methods of the above-described implementations, and all or some of the implementations may be selectively combined with one another to achieve various alterations.

The method of operating the terminal or the home appliance may be implemented as a code that can be written to a processor-readable recording medium and can thus be read by a processor. The processor-readable recording medium may be any type of recording device in which data can be stored in a processor-readable manner. For example, the processor-readable recording medium may include a ROM, a RAM, a CD-ROM, a magnetic tape, a floppy disk, optical data storage, and a carrier wave or data transmission over the Internet. The computer-readable recording medium may be distributed over a plurality of computer systems connected to a network so that processor-readable code can be written thereto and executed therefrom in a decentralized manner. Functional programs, code, and code segments to realize the implementations herein may be construed by one of ordinary skill in the art.

What is claimed is:

1. A touch sensing apparatus comprising:
   a first plate configured to receive a touch input;
   a second plate spaced apart from the first plate;
   a piezoelectric element disposed between the first and second plates, the piezoelectric element being configured to generate electrical signals corresponding to the touch input received on the first plate, wherein ultrasonic waves are generated based on the electric signals from the piezoelectric element;
   a plurality of microphones configured to receive the ultrasonic waves; and
   a processor configured to determine a position of the touch input on the first plate based on the ultrasonic waves received by the plurality of microphones,
   wherein the piezoelectric element is configured to, based on an object being disposed on the first plate, generate an electrical signal corresponding to the touch input of the object on the first plate, and
   wherein the processor is further configured to:
      based on sound signals received by the plurality of microphones corresponding to the ultrasonic waves, determine a pressure applied to the first plate by the object and a position of the object on the first plate, and
      based on an increase of an intensity of the touch input on the first plate, determine the pressure applied to the first plate by the object and the position of the object on the first plate according to an increase of the electrical signal output from the piezoelectric element and an increase of at least one of a sound intensity of the ultrasonic waves or a frequency of the ultrasonic waves.

2. The touch sensing apparatus according to claim 1, wherein the processor is configured to determine the position of the touch input based on a difference between phases of the ultrasonic waves received by the plurality of microphones.

3. The touch sensing apparatus according to claim 1, wherein the processor is configured determine the position of the touch input on the first plate based on both a difference between levels and a difference between phases of the ultrasonic waves received by the plurality of microphones.

4. The touch sensing apparatus according to claim 1, wherein the processor includes:
   a preprocessor configured to perform a noise reduction signal processing of the ultrasonic waves received by the plurality of microphones; and
   an acoustic sound localization unit configured to determine an acoustic source location based on the processed signals from the preprocessor.

5. The touch sensing apparatus according to claim 4, further comprising:
   a calibration unit configured to calibrate the acoustic source location; and
   an optimizer configured to optimize the calibrated acoustic source location.

6. The touch sensing apparatus according to claim 1, further comprising a display,
   wherein the processor is configured to control a portion of the display corresponding to the determined position of the touch input to display a visual indicator.

7. The touch sensing apparatus according to claim 1, further comprising a communication unit,
   wherein the processor is configured to control the communication unit to transmit information corresponding to the determined position of the touch input to an external device.

8. The touch sensing apparatus of claim 1, wherein the first plate is disposed vertically above the piezoelectric element, and the piezoelectric element is disposed vertically above the second plate.

9. The touch sensing apparatus of claim 1, further comprising:
   an ultrasonic transducer attached to the piezoelectric element and configured to generate the ultrasonic waves corresponding to the electrical signals generated from the piezoelectric element.

10. A touch sensing apparatus comprising:
    a first plate configured to receive a touch input;
    a second plate spaced apart from the first plate;
    a piezoelectric element disposed between the first and second plates, the piezoelectric element being configured to generate electrical signals corresponding to the touch input on the first plate;
    a plurality of microphones configured to receive ultrasonic waves generated based on the electrical signals from the piezoelectric element; and
    a processor configured to determine a position of the touch input on the first plate based on a change in the ultrasonic waves received by the plurality of microphones,
    wherein the piezoelectric element is configured to, based on an object being disposed on the first plate, generate an electrical signal corresponding to the touch input of the object on the first plate, and
    wherein the processor is further configured to:
       based on sound signals received by the plurality of microphones corresponding to the ultrasonic waves, determine a pressure applied to the first plate by the object and a position of the object on the first plate, and based on an increase of an intensity of the touch input on the first plate, determine the pressure applied to the first plate by the object and the position of the object on the first plate according to an increase of the electrical signal output from the piezoelectric element and an increase of at least one of a sound intensity of the ultrasonic waves or a frequency of the ultrasonic waves.

11. The touch sensing apparatus according to claim 10, wherein the ultrasonic waves have different frequencies from each other, and wherein the processor is configured to determine the position of the touch input on the first plate based on respective changes in the ultrasonic waves.

12. The touch sensing apparatus according to claim 10, wherein the processor is configured to determine the position of the touch input on the first plate based on a difference between phases of the ultrasonic waves received by the plurality of microphones.

13. The touch sensing apparatus according to claim 10, wherein the processor includes:

a preprocessor configured to perform a noise reduction signal processing of the ultrasonic waves received by the plurality of microphones; and an acoustic sound localization unit configured to determine an acoustic source location based on the processed signals from the preprocessor.

14. The touch sensing apparatus according to claim 13, further comprising:

a calibration unit configured to calibrate the determined acoustic source location; and an optimizer to optimize the calibrated acoustic source location.

15. A home appliance comprising:

a touch sensing apparatus configured to receive a touch input and determine a position of the touch input; and a controller configured to perform an operation corresponding to the touch input, wherein the touch sensing apparatus comprises:
a first plate configured to receive the touch input,
a second plate spaced apart from the first plate,
a piezoelectric element disposed between the first and second plates, the piezoelectric element being configured to generate electrical signals corresponding to the touch input on the first plate, wherein ultrasonic waves are generated based on the electric signals from the piezoelectric element,
a plurality of microphones configured to receive the ultrasonic waves, and a processor configured to determine the position of the touch input on the first plate based on the ultrasonic waves received by the plurality of microphones, wherein the piezoelectric element is configured to, based on an object being disposed on the first plate, generate an electrical signal corresponding to the touch input of the object on the first plate, and wherein the processor is further configured to:
based on sound signals received by the plurality of microphones corresponding to the ultrasonic wave, determine a pressure applied to the first plate by the object and a position of the object on the first plate, and based on an increase of an intensity of the touch input on the first plate, determine the pressure applied to the first plate by the object and the position of the object on the first plate according to an increase of the electrical signal output from the piezoelectric element and an increase of at least one of a sound intensity of the ultrasonic waves or a frequency of the ultrasonic waves.

16. A method for controlling a touch sensing apparatus including a first plate, a second plate, a piezoelectric plate disposed between the first plate and the second plate, and a plurality of microphones, the method comprising:

receiving a touch input on the first plate;
generating electrical signals corresponding to the touch input received on the first plate;
generating ultrasonic waves corresponding to the electrical signals from the piezoelectric element;
receiving the ultrasonic waves by the plurality of microphones;
determining a position of the touch input on the first plate based on the ultrasonic waves received by the plurality of microphones, wherein determining the position of the touch input comprises:
receiving, from the plurality of microphones, sound signals corresponding to the ultrasonic waves,
based on the sound signals, determining a pressure applied to the first plate by the touch input and the position of the touch input on the first plate, and
based on an increase of an intensity of the touch input on the first plate, determining the pressure applied to the first plate by the touch input and the position of the touch input on the first plate according to an increase of the electrical signals output from the piezoelectric element and an increase of at least one of a sound intensity of the ultrasonic waves or a frequency of the ultrasonic waves.

* * * * *